United States Patent [19]
Zwadlo

[11] Patent Number: 5,493,321
[45] Date of Patent: Feb. 20, 1996

[54] METHOD AND APPARATUS OF CHARACTERIZATION FOR PHOTOELECTRIC COLOR PROOFING SYSTEMS

[75] Inventor: Gregory L. Zwadlo, Ellsworth Township Pierce County, Wis.

[73] Assignee: Minnesota Mining and Manufacturing Company, St. Paul, Minn.

[21] Appl. No.: 22,116

[22] Filed: Feb. 25, 1993

[51] Int. Cl.$^6$ .............................. H04N 1/46; G03G 15/01
[52] U.S. Cl. ...................... 347/131; 347/124; 347/188; 355/208; 358/300
[58] Field of Search ................... 355/208, 200; 358/300, 296, 298; 347/124, 131, 188

[56] References Cited

U.S. PATENT DOCUMENTS

| | | | |
|---|---|---|---|
| 3,799,668 | 3/1974 | McVeigh | 355/4 |
| 4,335,398 | 6/1982 | Yamada | 358/80 |
| 4,600,669 | 7/1986 | Ng et al. | 430/47 |
| 4,702,206 | 10/1987 | Harries | 123/246 |
| 4,708,459 | 11/1987 | Cowan et al. | 355/4 |
| 4,725,867 | 2/1988 | Ng et al. | 355/4 |
| 4,728,983 | 3/1988 | Zwadlo et al. | 355/4 |
| 4,736,223 | 4/1988 | Suzuki | 355/4 |
| 4,752,822 | 6/1988 | Kawamura | 358/80 |
| 4,839,722 | 6/1989 | Barry et al. | 358/80 |
| 4,841,360 | 6/1989 | Birgmeir | 358/80 |

(List continued on next page.)

FOREIGN PATENT DOCUMENTS

| | | | |
|---|---|---|---|
| 0144188 | 6/1985 | European Pat. Off. | H04N 1/46 |
| 0448250 | 9/1991 | European Pat. Off. | H04N 1/46 |

OTHER PUBLICATIONS

Research Disclosure Nov. 1989.
Gravaure Parameters, 4th Draft Nov. 1990 for Circulation of the ERA Management Meeting W/out Appendices.
Bruno, M., *Principles of Color Proofing, GAMA Communications*, Chapter VIII, pp. 193–212, 1986.
Zwadlo, G., Additivity Effects in SCE, Additivity Effects in SCE; Using DMP™ to Emulate Ink on Paper and Matchprint™, pp. 1–6, 1992.

*Primary Examiner*—Benjamin R. Fuller
*Assistant Examiner*—Raquel Yvette Gordon
*Attorney, Agent, or Firm*—Gary L. Griswold; Walter N. Kirn; William D. Bauer

[57] ABSTRACT

An improved method and apparatus for characterizing a full color gamut of a digital photosensitive color proofing system having at least two separately controllable process parameters uses a one page color standard for calibrating the full color gamut. The one page color standard includes a plurality of color density test areas on the page, with each color density test area having a test patch for each colorant printed at a selected color density that is within a range of color densities, and a plurality of tone rendition test areas on the same page. There is one tone rendition area for each of the color density test areas, and each tone rendition test area has a plurality of test tints for each colorant as a primary color and a plurality of test patches for a set of secondary colors composed from combinations of the primary colors. The method for producing the one page color standard includes the steps of adjusting a first process parameter to produce the plurality of color density test areas, adjusting a second process parameter to produce the plurality of tone rendition test areas, and then printing the single color standard or test pattern page. The characterization process of the present invention involves the steps of measuring selected ones of the test patches and test tints to define or characterize the full color gamut, including a primary color gamut, a secondary color gamut and tone renditions, for the range of color densities. An optional step of mapping or matching the full color gamut of the color proofing system to a full color gamut of a target printing system by establishing the required first and second process parameters can be performed to best optimize a two-dimensional color transfer function between the two color gamuts.

29 Claims, 14 Drawing Sheets

U.S. PATENT DOCUMENTS

| | | | |
|---|---|---|---|
| 4,843,458 | 6/1993 | Ito | 358/80 |
| 4,853,738 | 8/1989 | Rushing | 353/327 |
| 4,894,685 | 1/1990 | Shoji | 355/246 |
| 4,905,079 | 2/1990 | Hayashi | 358/78 |
| 4,949,135 | 8/1990 | Ng | 355/327 |
| 4,959,790 | 9/1990 | Morgan | 358/80 |
| 4,963,925 | 10/1990 | Miyazaki | 355/77 |
| 4,972,257 | 11/1990 | Birnbaum et al. | 358/80 |
| 5,031,534 | 7/1991 | Brunner | 101/365 |
| 5,103,260 | 4/1992 | Tompkins et al. | 355/208 |
| 5,121,196 | 6/1992 | Hung | 358/75 |
| 5,126,760 | 6/1992 | DeBoer | 346/108 |
| 5,181,124 | 1/1993 | Close et al. | 358/300 |

METHOD AND APPARATUS OF CHARACTERIZATION FOR PHOTOELECTRIC COLOR PROOFING SYSTEMS

RELATED APPLICATIONS

The following commonly assigned, co-pending United States patent applications are related to the present invention. The disclosure of each application is hereby incorporated by reference in this application:

Ser. No. 07/807,076, filed on Dec. 13, 1991, in the name of Bresina et al., and entitled "Method for Calibrating an Electrophotographic Proofing System";

Ser. No. 07/808,016, filed on Dec. 13, 1991, in the name of Nordeen et al., and entitled "Density Process Control for an Electrophotographic Proofing System";

Ser. No. 07/862,346, filed on Apr. 2, 1992 in the name of Rylander et al., and entitled "Color Correction with a Four-Dimensional Look-up Table"; and Ser. No. 07/932,087, filed on Aug. 19, 1992, in the name of Fisch and entitled "Color Matching with Digital Electronic Files".

1. Technical Field

This invention relates generally to the printing of off-press, digital color proof images by a digital photosensitive color proofing system. In particular, this invention relates to an improved method and apparatus for characterizing a full color gamut for photoelectric color proofing systems in order to more accurately calibrate and match digital color proof images produced by such systems.

2. Background of the Invention

Color proofing systems are well known in the printing art. The proofs that are generated by a color proofing system are used in the printing process to predict the appearance of a final printed image prior to making a production press run. By observing and analyzing the proof, the printer can make necessary changes to the press set up without wasting expensive press time, paper and ink.

To better understand color proofing systems, it is important to understand the actual printing systems which the proofs are attempting to emulate. Commercial color reproduction in large quantities, such as color printing of newspapers or catalogs, is accomplished almost exclusively through a plate printing process. In a plate printing process, the image to be printed is produced once on a plate that is then inked and transferred or printed on a press to produce the number of copies desired. When color reproduction is desired, the plate printing process uses a color separation process based on the three color theory of light that separates an image into the three primary colors and then recombines the color separations in order to generate a full color gamut. In the plate printing process for color separation, three color separation plates are created using filters of the three additive primary colors red, green and blue (RGB). These color separation plates are then inked with the colors of the three subtractive primary colors, yellow, magenta, and cyan (YMC), and are printed over and next to each other on successive steps in order to reproduce the full color gamut. A fourth color plate with black ink (K) is usually used in addition to the three subtractive primary colors to extend the tone range of the printed colors. An excellent background of color proofing systems is set forth in Bruno, M., *Principles of Color Proofing*, GAMA Communications (1986).

Proofing systems are divided into two general types: press proofs and off-press proofs. So called "press proofs" are proofs made on a printing press, and require the making of plates, mounting of the plates on the press, making the press ready for a run, and actually running a limited number of prints. "Pre-press" or "off-press" proofs use photochemical, photomechanical, or photoelectric processes that present a proof image that attempts to simulate the appearance of a press printed image. Off-press proofs are less expensive and faster to make than press proofs, because the proofs are created without the need for preparing and making plates, and running the plates on a printing press. The off-press proof provides control information that can be easily monitored and altered before thousands or tens of thousands of prints are made by the printing process.

While both photomechanical and photochemical off-press color proofing systems have met with some success, most of the current efforts in color proofing systems are directed toward the improvement of color proofing systems that are based on digital application and control of laser light, primarily by the use of photosensitive or electrophotographic principals. Of the various types of digital photosensitive color printers and digital color copiers, most of these devices are not well-suited for use in a color proofing system because they are not capable of producing a high resolution color image having more than 1,000 dots per inch (2,540 dots per centimeter). Currently, several types of digital photosensitive color proofing systems are capable of producing the type of high resolution color proof images required for off-press color proofing: electrophotographic contact proofing, as shown, for example, in U.S. Pat. No. 4,600,669; digital electrophotographic proofing, as shown, for example, in U.S. Pat. No. 4,725,867; and laser addressed liquid ink superposed color electrophotography (SCE), as shown, for example, in U.S. Pat. No. 4,728,983. Another type of digital photosensitive proofing system that is also capable of producing the type of high resolution color proof images required for off-press color proofing is laser induced thermal diffusion transfer (LIDT), as shown, for example, in U.S. Pat. No. 5,126,760. Although the LIDT process does not use an electrophotographic process, per se, for purposes of the present invention, the LIDT process is considered a digital photosensitive color proofing system.

One of the keys to a good color proofing system is accurate control of the color reproduction characteristics of the color proofing system. Numerous variations in the color reproduction characteristics of the YMCK colorants, the printing media, and the particular photoelectric color proofing system itself can alter the color reproduction characteristics of the system, and thereby affect the quality of the color proof image produced by the photoelectric color proofing system. Consequently, color proofing systems use a variety of color calibration techniques in order to control the color reproduction characteristics of the system. For color proofing systems, color calibration techniques fall into one of two general categories: internal calibration techniques and external calibration techniques.

Internal color calibration techniques are used within a system to guarantee consistent color reproduction between successive printed images. These types of internal color calibration techniques are also used for color copiers and color printers. Automatic color feedback control systems for a color copier are shown, for example, in Kawamura, U.S. Pat. No. 4,752,822; Shoji, U.S. Pat. No. 4,894,685; Ito, U.S. Pat. No. 4,843,458; Suzuki, U.S. Pat. No. 4,736,223; Rushing, U.S. Pat. No. 4,853,738; and Hayashi, U.S. Pat. No. 4,905,079. Operator controlled color compensation systems for a color copier are shown, for example, in Birnbaum et al., U.S. Pat. No. 4,972,257; Ng, U.S. Pat. No. 4,949,135; and Miyazaki, U.S. Pat. No. 4,963,925. Birgmeir, U.S. Pat. No. 4,841,360, discloses a color calibration system as part of a combination CRT color display and color printer system that maintains the color reproduction characteristics between the CRT display and the printer. In each of these references, the color calibration is an internal calibration that is maintained between an original image and a reproduction of that image.

In contrast to internal calibration techniques which are used for both color copiers and color printers, as well as color proofing systems, color proofing systems must also utilize some type of external calibration technique in order to ensure that a proof image produced on the proofing system will accurately represent the final printed image to be produced in quantity on a target printing system. Unlike internal calibration techniques which are designed to maintain consistency between an original image and a reproduction of that image, external calibration techniques correlate the color reproduction characteristics between a proof image and a final printed image, both of which are to be based on an original artwork image. The external calibration of a color proofing system involves the characterization of the color reproduction characteristics of the color proofing system so that those color reproduction characteristics may be matched or mapped to the color reproduction characteristics of the target printing system. Typically, two separate types of external calibration or characterization techniques are used for digital photosensitive color proofing systems: color density calibrations and tone reproduction calibrations.

In most digital photosensitive color proofing systems, the characterization of color density involves controlling the thickness of the ink or toner deposited on the substrate. A manual calibration technique for controlling the color density characteristics of reproductions of photoelectric color proofing systems is shown, for example, in McVeigh, U.S. Pat. No. 3,799,668. A calibration technique for measuring color density characteristics using RGB filter measurements of a pair of three-color neutral test patches is shown, for example, in Benoit, U.S. Pat. No. 4,702,206. The previously referenced co-pending application entitled "Method for Calibrating an Electrophotographic Proofing System" describes an automatic process for controlling the color density characteristics of a photoelectric color proofing system by periodically generating charge and development models for the color density for each colorant.

The characterization of tone reproduction, on the other hand, typically involves controlling the dot gain or tone reproduction function for the particular digital photosensitive color proofing system. Characterization of tone reproduction is necessary even after a density characterization because tone reproduction is dependent on the solid ink thickness used to obtain the selected solid area color gamut and is not obtained as a result of the density characterization of a color proofing system. Cowan et al., U.,S. Pat. No. 4,708,459, describes a system for modeling the electrophotographic proofing apparatus so as to control the dot size of the dots of ink or toner used to produce the color proof image. Another system for controlling tone rendition by color correction in a low resolution color photocopier is shown in Barry et al., U.S. Pat. No. 4,839,722. In Barry et al. the color correction is accomplished by printing a set of bars for each colorant at known different dot gains (referred to in the patent as input densities for the laser beam), and then using a set of RGB filters to determine the actual spectral content of these sets of bars. The previously referenced co-pending application entitled "Color Correction with a Four-Dimensional Look-up Table" describes a method for operating a computer to generate a look-up table of stored data to translate a first set of digital information defining a color image corrected for a first printing system into a second set of digital information for a second printing system, for the purpose of generating an image on the second printing system that approximates the color characteristics of an image created on the first printing system.

In most of these systems, the characterization of a color proofing system for a full color gamut generally relies on the use of these two processes as two separate and distinct techniques, one for color density and one for tone rendition. As a result, when both characterization techniques are used a two-step process is required, at a minimum, in order to generate an accurate full color gamut characterization for the color proofing system. More typically, existing characterization techniques require a significant number of test images or color standards to be printed before an accurate full color gamut characterization can be generated for the color proofing system. For example, in the Benoit et al. patent, the color density characterization technique is accomplished by printing a single test image; however, prior to the printing of that single test image, many test images must be printed in order to characterize the model for tone reproduction for the particular color printing system. In this sense, the Benoit et al. patent is representative of the separate nature of the two main characterization processes.

Although existing techniques for the external color calibration or characterization of digital photosensitive color proofing systems are capable of producing a calibrated digital proof image on a first off-press proofing system that will represent the final printed image to be produced in quantity on a second printing press system, these techniques are separate and distinct from one another and the characterization of a full color gamut for a color proofing system requires the printing of multiple color standards as part of a multiple step characterization process. Accordingly, it would be desirable to provide for an improved method and apparatus for printing and measuring a digital color image produced by a digital photosensitive color proofing system that could characterize the full color gamut capability of the color proofing system without requiring the printing of multiple color standards as part of a multiple step characterization process.

SUMMARY OF THE INVENTION

The present invention is an improved method and apparatus for characterizing a full color gamut of a digital photosensitive color proofing system having at least two separately controllable process parameters by printing only a single page color standard. A one page color standard for characterizing the full color gamut includes a plurality of color density test areas on the page, with each color density test area having a test patch for each colorant printed at a selected color density that is within a range of color densities, and a plurality of tone rendition test areas on the same page. There is one tone rendition area for each of the color density test areas, and each tone rendition test area has a plurality of test tints for each colorant as a primary color and a plurality of test patches for a set of secondary colors composed from combinations of the colorants. As a result of selected measurements of the test patches and test tints from a single page color standard, it is possible to define the full color gamut, including a primary color gamut, a secondary color gamut and tone rendition models, for the range of color densities for the digital photosensitive color proofing system.

The method for producing the one page color standard includes the steps of adjusting a first process parameter to produce the plurality of color density test areas, adjusting a second process parameter to produce the plurality of tone rendition test areas, and then printing the single color standard or test pattern page. The characterization process of the present invention involves the steps of measuring selected ones of the test patches and test tints to determine the full color gamut range, including a primary color gamut, a secondary color gamut and tone rendition models, for the range of color densities. In the preferred embodiment, a desired set of target conditions for the primary and secondary color values and tone rendition of a color print image are selected and the primary and secondary color gamut and tone renditions for the range of color densities printed by the color proofing system are then optimized to the selected target conditions. The end result is the creation of a two-dimensional transfer function for mapping or matching the full color gamut of the color proofing system to the full color gamut for the target conditions.

BRIEF DESCRIPTION OF THE DRAWINGS

The foregoing advantages, construction and operation of the present invention will become more readily apparent from the following description and accompanying drawings in which:

FIG. 4A is a portion of the pictorial illustration of FIG. 4 showing greater detail of portion 110a;

FIG. 4D is a portion of the pictorial illustration of FIG. 4 showing greater detail of portion 110d;

DETAILED DESCRIPTION OF THE PREFERRED EMBODIMENTS

Figure 1:
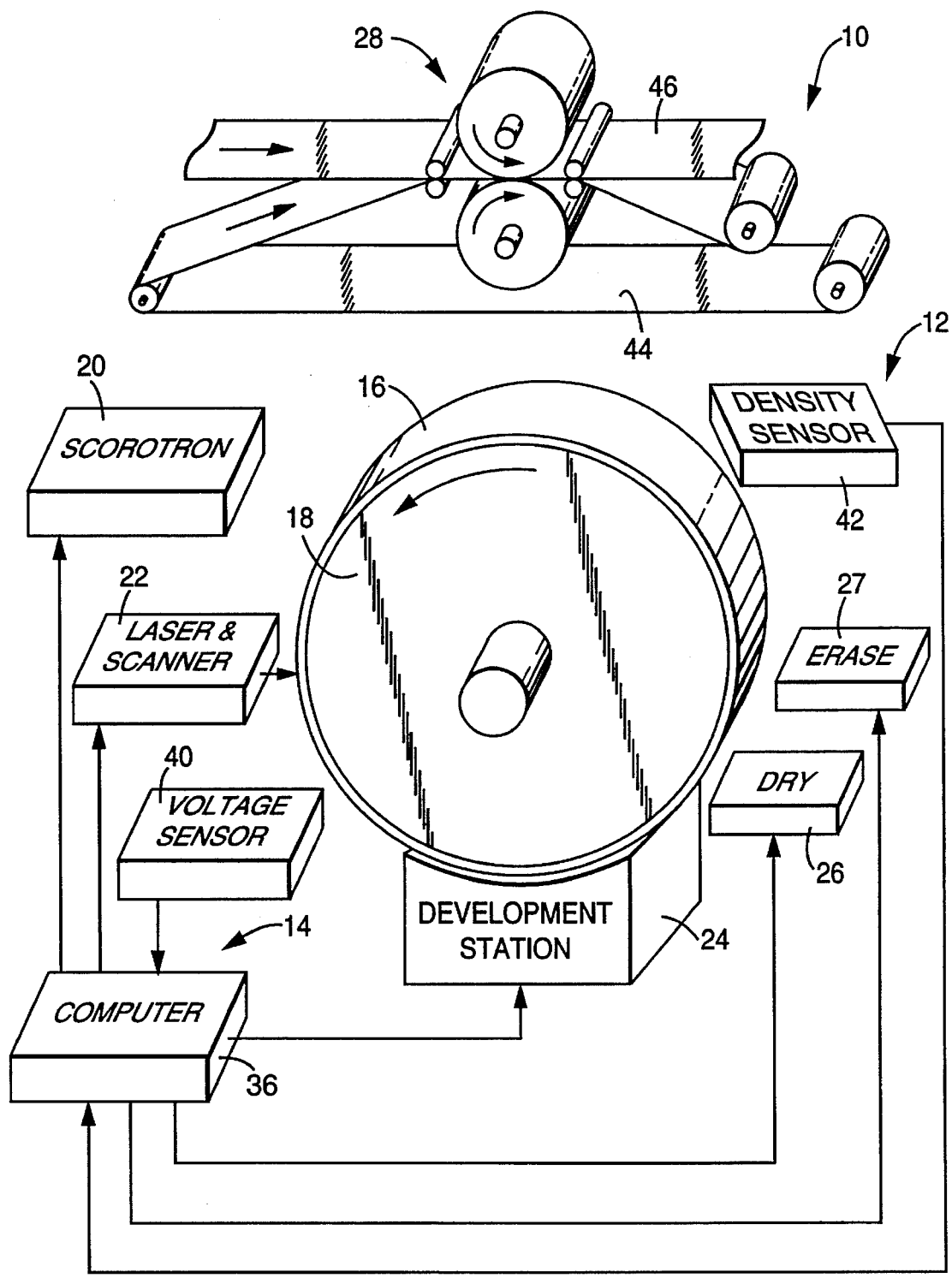
FIG. 1 is a block and pictorial diagram of an electrophotographic proofing system in which the color gamut characterization procedure of the present invention can be implemented.
Figure 2A:
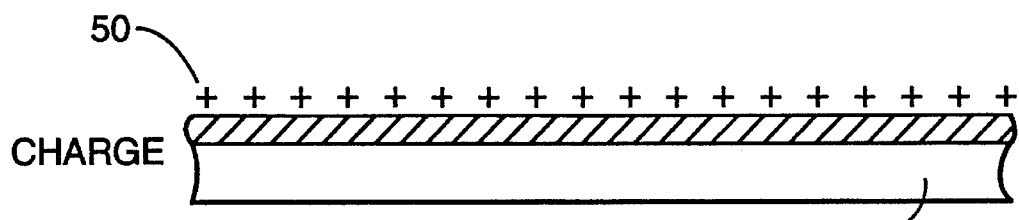
FIGS. 2a, 2b, 2c, 2d and 2e are pictorial diagrams illustrating the electrophotographic process implemented by the proofing system shown in FIG. 1.
Figure 2B:
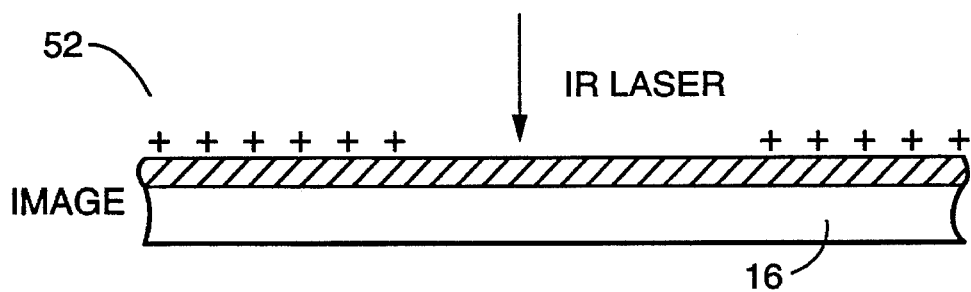
Figure 2C:
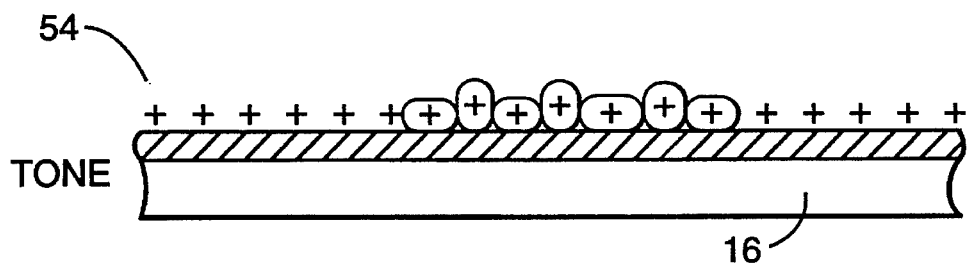
Figure 2D:
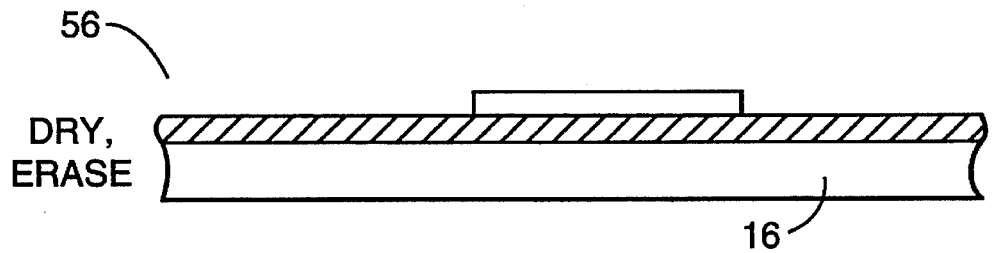
Figure 2E:
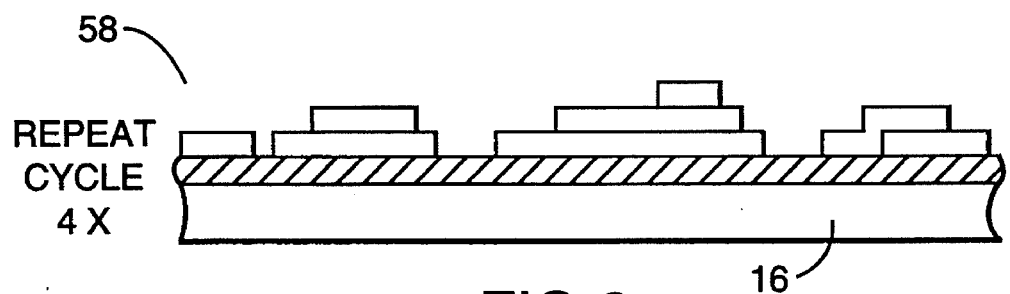

FIG. 1 is a block and pictorial diagram of a digital electrophotographic color proofing system 10 that utilizes the single step characterization procedure of the present invention. The preferred embodiment of the proofing system 10 uses an electrophotographic process and apparatus of the type described in detail in U.S. Pat. No. 4,728,983, Zwadlo, Single Beam Full Color Electrophotography, issued Mar. 1, 1988, which is hereby incorporated by reference, although it will be understood that the present invention is equally applicable to other types of high resolution digital photosensitive color proofing systems.

Proofing system 10 includes a proofing engine 12 preferably controlled by a computer-based control system 14. In the embodiment shown, proofing engine 12 includes a film of organic photoconductor (OPC) 16 on rotating drum 18, scorotron 20, laser and scanner 22, development station 24, dry station 26, erase station 27 and transfer station 28. In addition to computer 36, control system 14 includes voltage sensor 40 and density sensor 42. Development station 24 includes four identical toning stations (not shown), one for each of the primary component colors used to generate the color proofs.

The electrophotographic proofing process implemented by proofing system 10 can be described generally with reference to FIGS. 1 and 2a through 2e. Digital continuous tone, high resolution text, graphics, edge and contour data, and other image information representative of the image to be printed is stored within memory (not separately shown) of computer 36. From the image information computer 36 generates digital information representative of a set of binary or half-tone patterns, one pattern for each of the component colors used by system 10. In the embodiment described below, proofing system 10 uses developer station 24, dry station 26 and erase station 27. Each imaging cycle begins with the application of a grid voltage, $V_g$, to scorotron 20. The grid voltage is a charge control parameter which causes scorotron 20 to charge the surface of OPC 16 to a charged or initial voltage, $V_i$, as shown at 50 in FIG. 2a. Alternatively, the intensity of the laser 22 could be used as the charge control parameter. As shown at 52 of FIG. 2b, the charged OPC 16 is then exposed or imaged by a scanning laser beam as the OPC rotates past laser and scanner 22. The laser beam is on-off modulated as a function of the component color half-tone pattern to partially discharge the portions of OPC 16 upon which it is impinged, resulting in a discharged or final voltage, $V_f$, on the OPC.

As the imaged OPC 16 reaches developing station 24, a developer bias voltage, $V_b$, is applied to the appropriate development electrode to produce a development voltage contrast or development voltage, $V_d$, between the OPC 16 and toning station 24. The toner, which is charged, is thereby drawn to the imaged OPC 16 in accordance with the half-tone pattern and test patches as shown at 54 of FIG. 2c. With continued rotation of drum 18 the toned or developed OPC 16 passes dry station 26 and erase station 27 as indicated at 56 in FIG. 2d. The liquid toner is dried at station 26. Remaining charge on OPC 16 is dissipated at erase station 27. This imaging cycle procedure is repeated for each component color and its associated half-tone pattern to produce the developed image assembly shown at 58 of FIG. 2e. The proofing run is completed when the developed image assembly is removed from OPC 16 and applied to backing 46 by transfer station 28.

Figure 3:
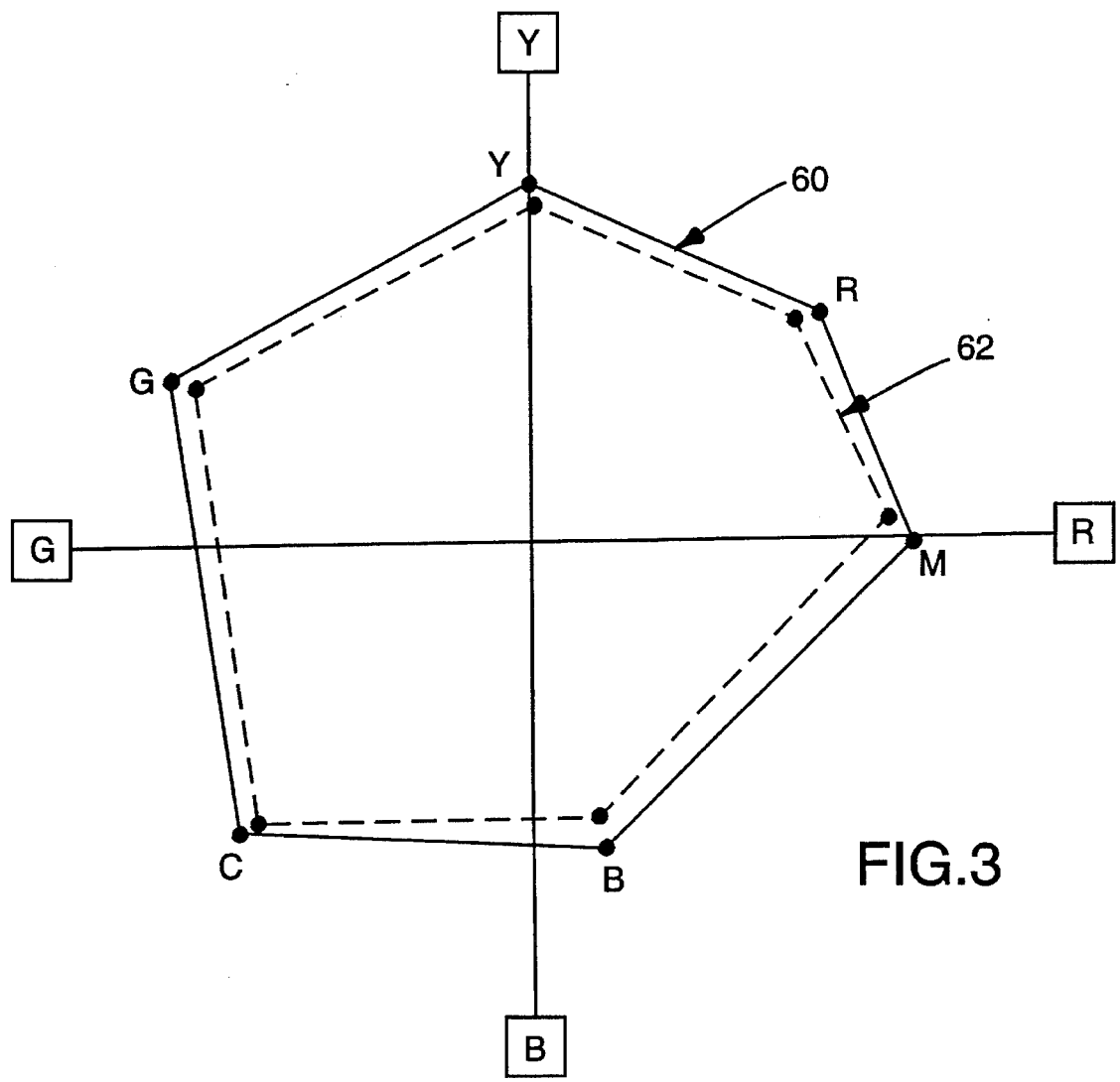
FIG. 3 is a graphic representation of a full color gamut.

Referring now to FIG. 3, a two-dimensional graphic representation of a full color gamut is shown. In the preferred embodiment, the full color gamut that defines the color reproduction characteristics of the color proofing system 10 is represented as a two-dimensional color plane taken at a given cross-section of the light-darkness axis of three dimensional color space. Several different representations for the two-dimensional color plane are used in the color proofing industry, including the Hunter, CIELAB and CIE-LUV color spaces. For a more detailed discussion of two-dimensional color planes, reference is made to Bruno, M., *Principles of Color Proofing*, GAMA Communications (1986), pgs. 325–328, which is hereby incorporated by reference.

In the preferred embodiment of the present invention, the CIELAB color space is used to define the full color gamut as shown in FIG. 3. The color gamut 60 as defined for the preferred embodiment of an SCE color proofing system 10 is shown by the solid line, and the color gamut 62 of the particular ink set and printing press to be used by the target printing system is shown by the dotted line. Due to the broad range of control mechanisms for the SCE color proofing system 10, the color gamut 60 has a broader range over which it can vary as compared to the color gamut 62 for a typical printing press, for example. This is particularly useful in allowing the color gamut 60 to be matched to a broader range of target color gamuts 62. While the color gamut 62 of a particular target printing system will vary, e.g., newspaper printing uses a lighter color gamut, whereas gravure printing uses a darker color gamut, generally the color gamut of most printing press systems is more restricted than the color gamut 60 of an electrophotographic color proofing system, for example. Alternatively, the color gamut 60 might be matched to another color proofing system, such as a contact proofing system like the MatchPrint™ color proofing system, available from Minnesota Mining and Manufacturing Company, St. Paul, Minn. (MatchPrint is a trademark of Minnesota Mining and Manufacturing Company). It will be apparent that, regardless of the particular target printing or digital photosensitive color proofing system, once the range of the color gamut 60 is determined or characterized, an appropriate two-dimensional transfer function can be constructed to generate the best match or map the color gamut 60 to the color gamut 62.

Figure 4:
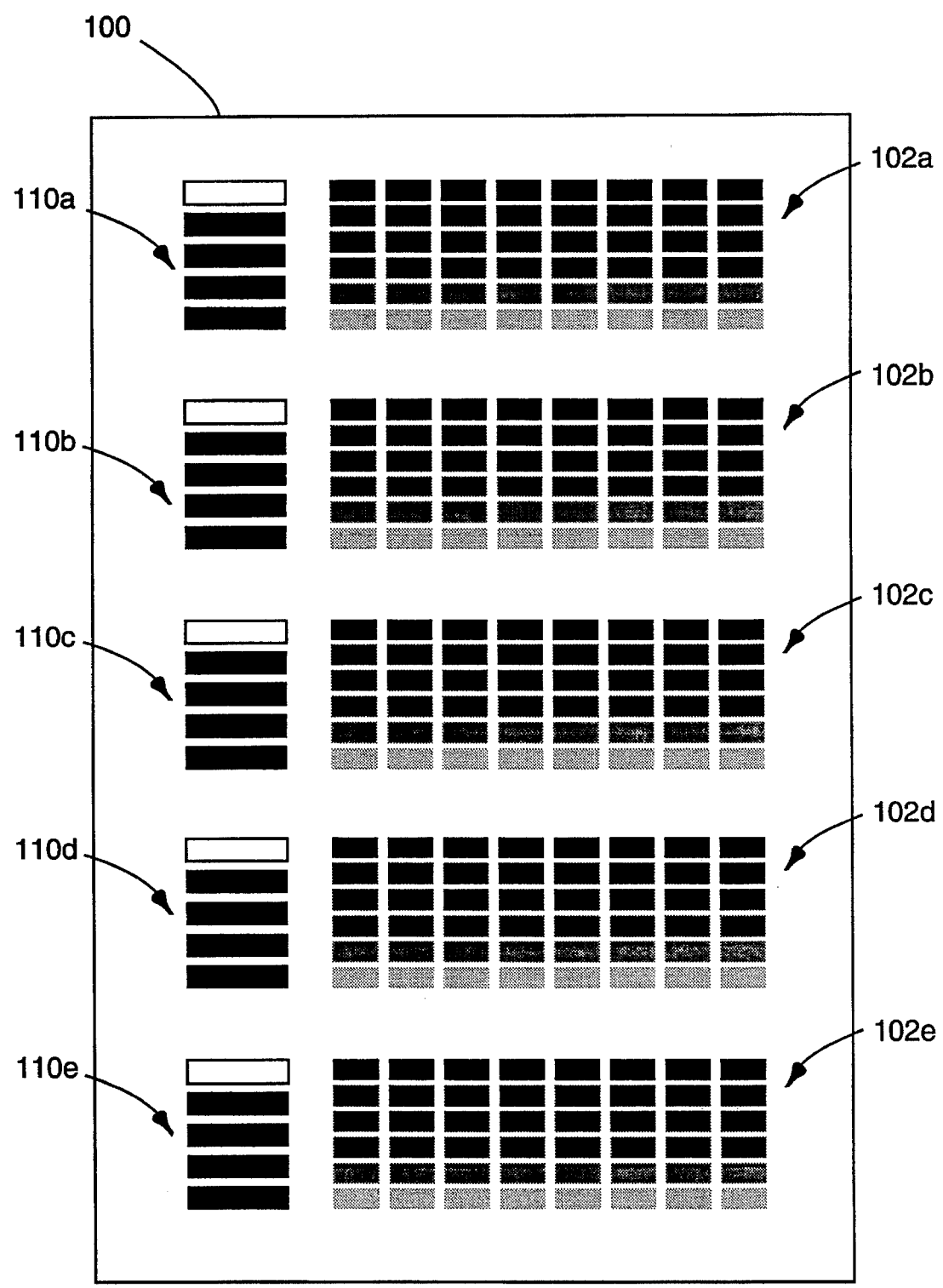
FIG. 4 is a pictorial illustration of a single test pattern page generated in accordance with the present invention.
Figure 4A:
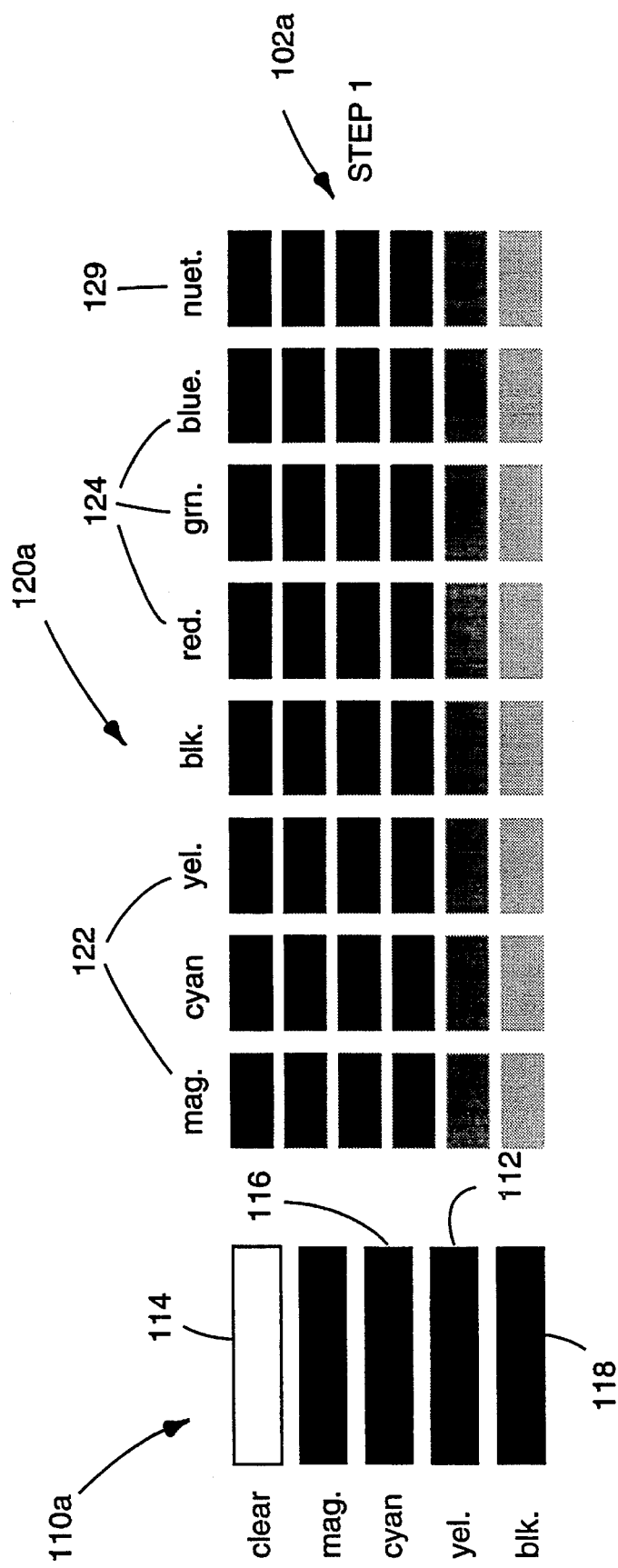
Figure 4B:
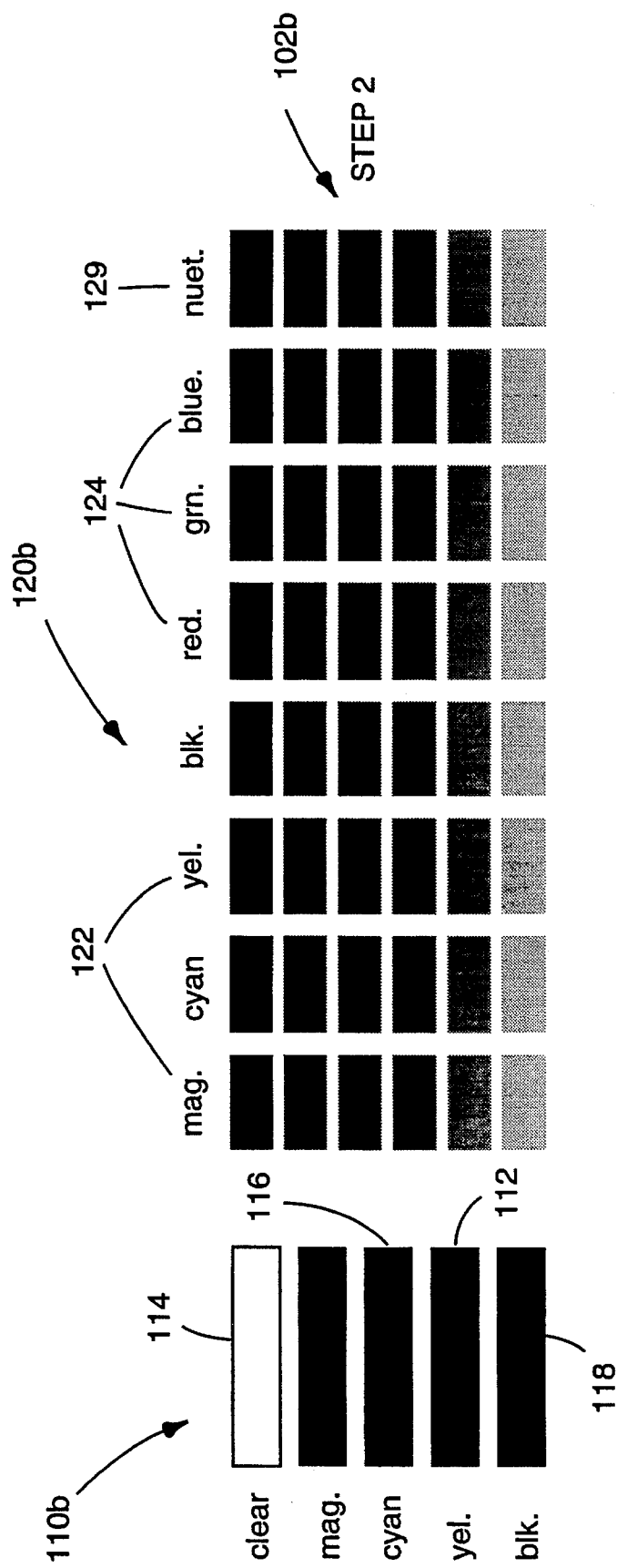
FIG. 4B is a portion of the pictorial illustration of FIG. 4 showing greater detail of portion 110b.
Figure 4C:
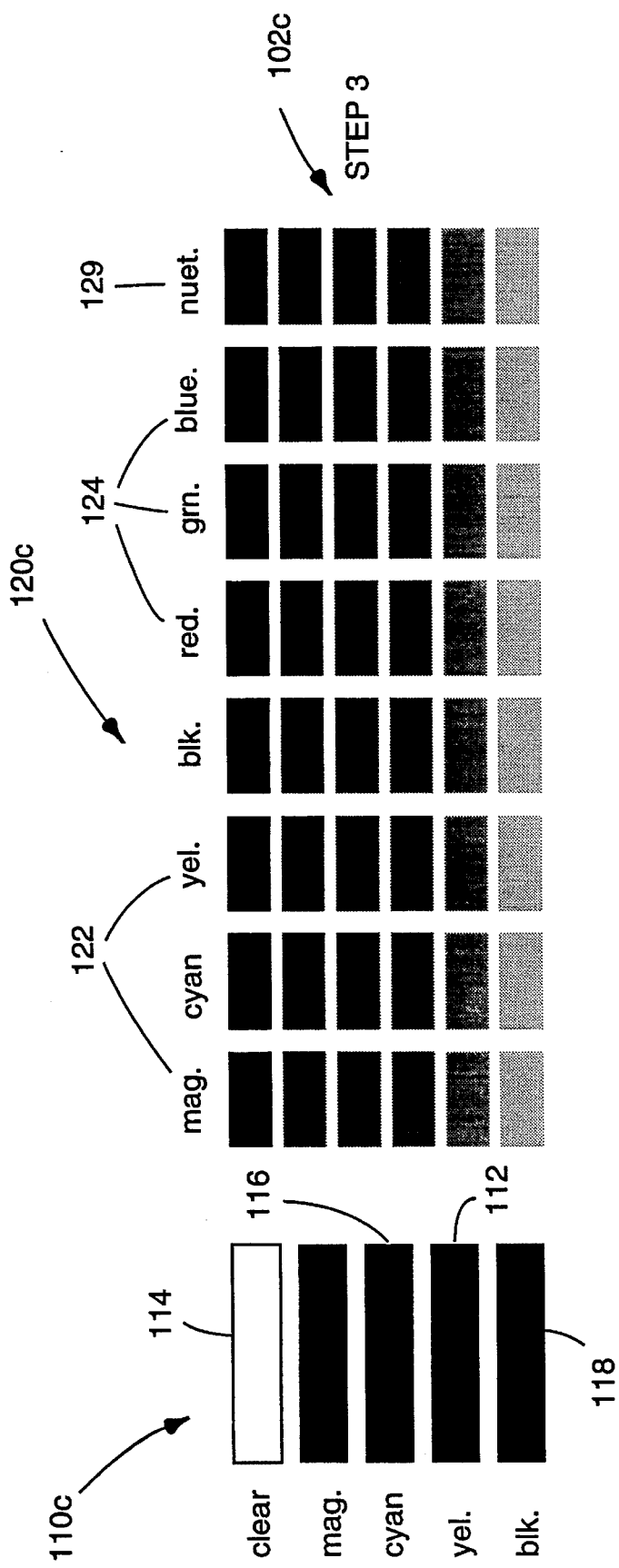
FIG. 4C is a portion of the pictorial illustration of FIG. 4 showing greater detail of portion 110c.
Figure 4:
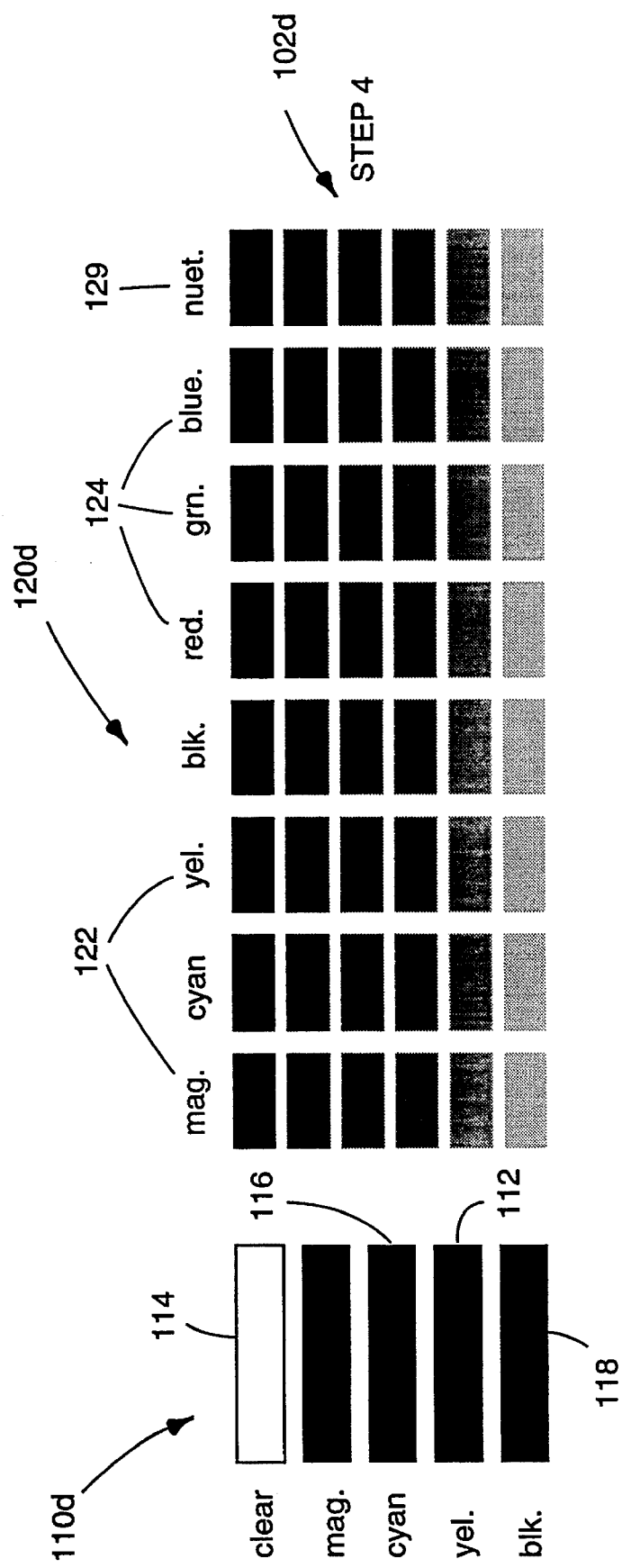
Figure 4E:
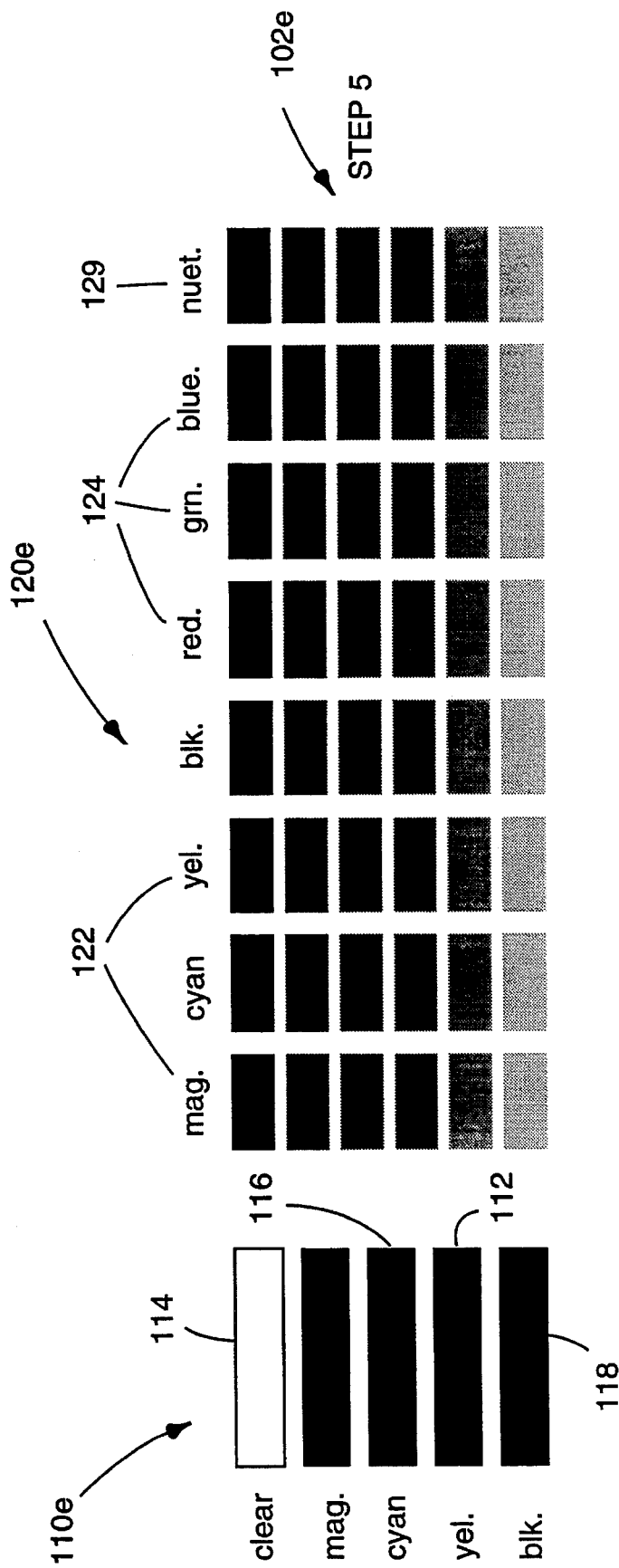
FIG. 4E is a portion of the pictorial illustration of FIG. 4 showing greater detail of portion 110e.

Referring now to FIGS. 4, 4a, 4b, 4c, 4d, 4e and 5, the preferred embodiment of producing the single test pattern page for the external color characterization procedures of the present invention will be described. FIG. 4 shows the single test pattern page 100 having a plurality of test segment image areas 102a–102e, with each segment image area 102 having a color density test area 110 located in a first portion of the image area 102 and a tone rendition test area 120 located in a second portion of the image area 102. Each segment image area 102a–102e is illustrated in more detail in FIGS. 2a–2e, respectively. For the proofing system 10 of the preferred embodiment, five density test areas 110a–110e are used to establish a first independent process parameter of the proofing system 10. In the preferred embodiment of the test pattern page 100, the density test areas 110a–110e are each comprised of four color patches 112, 114, 116 and 118, representing the primary subtractive colors yellow, magenta, and cyan and black. Each of the color patches 112, 114, 116 and 118 for each density test area 110a–110e are printed at a preselected first parameter that gives the dependent color density to give a range of color densities ($D_{max}$) samples. In the preferred embodiment, the range of color density samples for each colorant is generated by independently varying the ramp values of that colorants in order to vary the ratios of the color densities of the color patches 112, 114, 116 and 118 for each density test area 110a–110e. For example, the cyan range might be 1.2–1.5, and the yellow range might be 1.0–1.9, with both colorants having five equal size steps in the ramp from lowest to highest color density, but the difference in the cyan step versus the yellow step will result in a different density ratio of cyan to yellow throughout the range of color densities.

The tone rendition test areas 120a–120e associated with each segment image area 102a–102e are generated by altering a second independent process parameter. For each segment image area 102a–102e, the tone rendition test area 120 comprises a plurality of test tints 122 for each primary colorant in the color patches 112, 114, and 116, as well as a plurality of test patches 124, for a set of secondary colors, red, blue and green, composed from combinations of the primary colorants. An optional neutral test patch 129 comprised of a tertiary combination of all three primary colorants is also provided. In the preferred embodiment, a total of six test tints 122a–122f are used for each primary colorant, with the test tints varying in tonal intensity to obtain a range of tonal intensities ($T_i$) samples for each primary colorant. In this embodiment, the tone reproduction percentage ($T_i$) for each of the six test tints 122a–122f is selected such that an equidistant spacing of samples is obtained, i.e., 16%, 33%, 50%, 66%, 83% and 100%. Another alternative is to use a series of dot areas starting at 5% and incrementing in 5% values for each color within each segment 102. Still another alternative could use unequal gradations in the tone reproduction percentages ($T_i$) for each colorant in order to produce more neutral 3-color values.

It will be recognized that numerous variations in the number and value of the preselected samples for the $D_{max}$ and $T_i$ ranges could be used in accordance with the present invention. The only constraint on either of the independent process parameters is that a sufficient range of samples be produced so as to allow an accurate tonal rendition curve to be modeled for each colorant over the entire range of color densities. For example, the 100% test tint 122a need not necessarily be printed as the color information obtained is identical to the corresponding color patch value for that color. Conversely, the test patches 112, 114, 116 and 118 might not be printed and the 100% tint 122a could be used. Similarly, it is not necessary to reproduce the tint values for the secondary color test patches 124, in order to reproduce the entire color gamut characterization information. In the embodiment shown in FIG. 4, the tint values for the secondary color test patches 124 are reproduced to present the operator of the color proofing system 10 with more visual information about the color gamut from which to make any subjective modifications to the color gamut characterization, for example.

Figure 5:
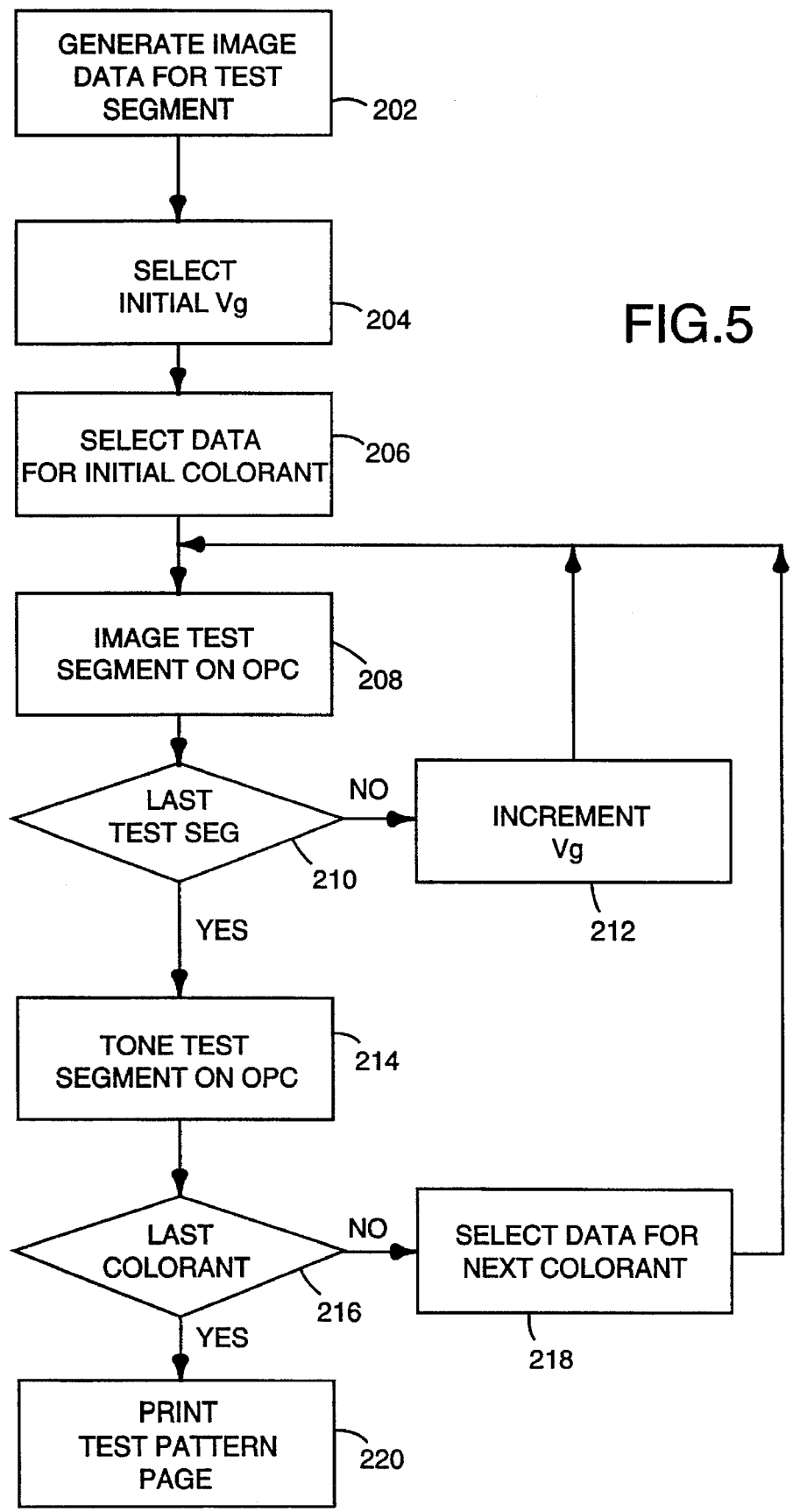
FIG. 5 is a flowchart illustrating the process for generating the single test pattern page shown in FIG. 4.

As shown in FIG. 4, the range of $D_{max}$ samples for the color proofing system 10 for each test segment 112a–112e is generated by altering a first process parameter, such as the grid voltage, $V_g$, to various voltage levels within a preselected minimum to maximum range of total charge acceptance. The range of $T_i$ samples is generated by altering a second process parameter, the tone reproduction percentage or dot area, as part of the image data that is generated for the test segment 102. In the preferred embodiment, the flow chart shown in FIG. 5 is implemented by a computer program operating within the computer 36 of the color proofing system 10.

At step 202, the test image data for the test segment 102 is produced in the form of four color YMCK color separation data, including the order and positioning of the test patches 112, 114, 116 and 118, as well as the order and positioning and tone reproduction percentages for the test tints 122 and the order, positioning and combination of primary colorants to produce the secondary color test patches 124. At step 204, an initial value of the grid voltage, $V_g$, is selected. Typical maximum and minimum values (to produce a desired $D_{max}$ range from 1.0 to 1.8 for the color proofing system described above) range from +300 volts to +1000 volts. At step 206, the image data for the initial colorant in the proofing system 10 is selected and is imaged onto the OPC 16 in the manner described above at step 208. At step 210, a test is made to see whether the last test segment 102 has been imaged. If not, the grid voltage, $V_g$, is incremented at step 212 to the next predetermined value and the process is repeated from Step 208. If all of the test segments 102 have been imaged, then at step 214 the OPC 16 is toned in the manner described above for that colorant. Step 216 tests to see if all of the colorants have been imaged and toned. If not, the image data for the next colorant is selected at step 218 and the process is repeated from step 208. If all of the test segments 102 have been imaged and toned, then the test pattern page 100 is transferred from the OPC 16 to the backing 46 at step 220 in the manner described above.

It will be understood that, in the preferred embodiment, the image data for each test segment 102 is initially produced to include the variations in the second process parameter, and then remains constant as the various test segments 102a–102e are imaged on the OPC 16. The image data could be produced individually for each test segment, so long as the characterization process described below is matched to the image data that has been produced. It will be further understood that although the preferred embodiment is described in terms of incrementing the grid voltage through the entire $D_{max}$ range for each of the four colorants, an alternative procedure would be to image and tone each test segment for all four colorants before incrementing the grid voltage for the next test segment 102.

Figure 6:
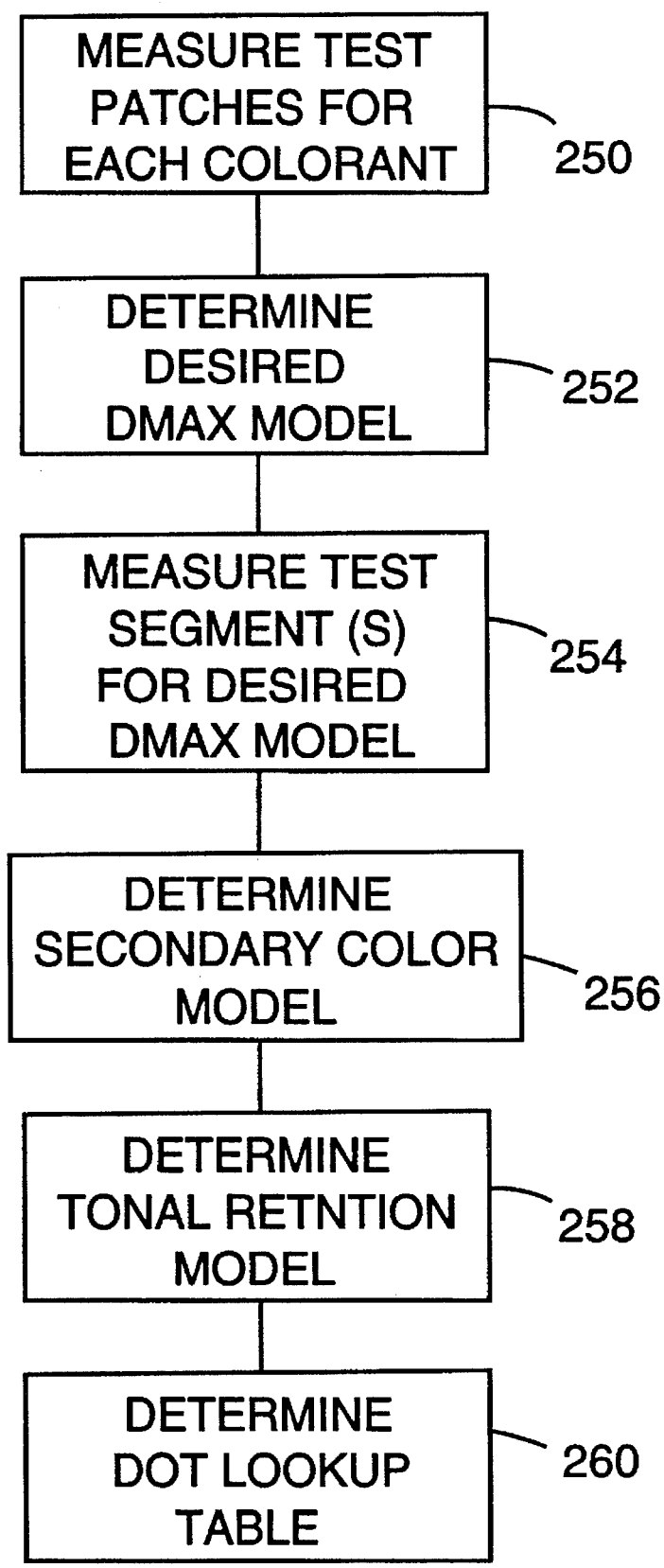
FIG. 6 is a flowchart illustrating the process for characterizing the proofing system using the test pattern page shown in FIG. 4.

Referring now to FIG. 6, the preferred embodiment of the characterization portion of the process of the present invention will now be described. The objective of the characterization process of the present invention is to generate an accurate model color gamut 60 for the proofing system 10. Using this color gamut, a two-dimensional transfer function or set of "corrections" can be applied to the proofing system 10 such that the full color gamut 60 of the color proofing system 10 is matched or mapped as close as possible to the color gamut 62 of the target printing system.

At step 250, the test patches 110 for each colorant for each segment 102 are measured to produce single color ink thickness values. These values may be measured with a densitometer or a spectrophotometer to obtain colorimetric values such as L*a*b*. As described in greater detail below, these values are used to obtain a model of $D_{max}$ for each colorant as a function of the first process parameter at step 252. At step 254, the tone rendition areas 120 for each segment 102 of interest are measured. Depending upon the color gamut of interest, the $D_{max}$ model can be used to limit the tone rendition areas 120a–120e that need to be measured. For example, if the $D_{max}$ model shows that only segments 102c and 102d are required in order to provide the data necessary for determining a color gamut for a particular printing press being modeled, then it is not necessary to measure the tone rendition areas 120a, 120b or 120e. On the other hand, if an entire color gamut is desired, all of the tone rendition areas 120a–120e can be measured, in which case it is not necessary to perform step 252 prior to step 254. The secondary test patches 124 can be measured with a densitometer to obtain complementary absorption of the colors for the filter set to obtain trap values, or with a spectrophotometer to obtain colorimetric values such as hue angle and chroma. The test tints 122a–122f can be measured with similar instruments, provided that the instrument is sufficiently accurate to reproduce the desired color gamut.

It will be apparent that steps 250–254 can be accomplished in a variety of ways. The measurements may be taken manually using a hand held instrument and measuring the areas one at a time, or automatically using a scanner preprogrammed to measure the desired locations on the test pattern page 100. The calculations necessary to produce the desired colorimetric values may be done manually, or may be done automatically using, for example, a software package known as MicroFlash™, available from Data Color International.

The next steps in the characterization process are to build models of the imaging process of the proofing system 10 so that correct process parameters for both the first and second independent process parameters, as well as any other internal system parameters, can be generated. From these models, the full color gamut 60 of the color proofing system 10 can be derived.

At step 256, a secondary color model is generated. It will be recognized that, even though an accurate $D_{max}$ model has been generated for the primary colorants, the set of actual $D_{max}$ values obtained by measuring the color densities of single colorant test patches 110 will most likely not produce the ideal secondary color gamut measurements. For example, the measured cyan ink color values may be significantly different than the measured yellow ink thickness within one of the test segment image areas 102 such that the green hue angle will be arbitrarily distorted. This is one of the primary reasons why a two step characterization process has been used for proofing systems. An accurate set of $D_{max}$ values for each primary colorant would be obtained by printing a first test pattern page, then those $D_{max}$ values would be used to print one or more subsequent test pattern pages to determine the secondary color values; and then the primary colorant $D_{max}$ values would be readjusted again to optimize the full primary and secondary color gamut.

Unlike the external calibration techniques which require printing multiple test pattern pages, the present invention uses both the $D_{max}$ values for the range of test patches 110a–110e and the overprint measurements for the secondary color patches 124 to model the hue angle or trap value of the selected secondary color as a function of the amount of ink thickness of each primary colorant, In the preferred embodiment, the trap value of a secondary color is expressed as a percentage ink trapped according to the following equation, where 1 and 2 represent the two primary colorants combined to create the secondary color and F2 represents the filter of the primary colorant 2:

$$\% \text{ INK}_{TRAP} = ((ROD_{1\&2})_{F2}/((ROD_1)_{F2}+(ROD_2)_{F2})) \times 100 \qquad \text{Eq. 1}$$

It has been determined that the ability to model the hue angle or trap value of the selected secondary color as a function of the amount of ink thickness of the primary colorants is dependent upon a proper understanding of the additivity failure of a color printing system. The additive rule in color reproduction as stated by Hunt is as follows: "The red, green or blue printing density of any mixture of three colorants should be equal to the sum of the red, green or blue printing densities of the three colorants measured separately". Additivity failure in lithographic color proofing systems is primarily caused by trapping, where ink transfer is affected by previous ink layers on the paper. Additivity failure in SCE color proofing systems is similar to the ink on paper problem of lithography. However, ink trap is caused by electrostatic and chemical charge interactions, as well as variations in the ink thickness of the previous colors down in a secondary or tertiary color combination. Small variations in primary ink color at the selected ink thickness level can also affect the color values of the overprinted inks. This loss in ink density over previous ink deposits in both lithography and SCE color proofing systems allows a close proof match between these systems with respect to tone reproduction. Additivity failure may also be caused by lack of transparency of the colorants which can reduce the saturation of the image and is likewise similar in both cases.

In order to compensate for the additivity failure of lithographic and SCE color proofing systems, a quantification of the additivity failure of an SCE color proofing system was undertaken to determine the additivity relationships to consistently emulate colorants on paper or other target media produced by this system. The experimental procedure and results are set forth below. It will be recognized that although these results are generated for a particular SCE type color proofing system using particular colorants and papers, the results are general enough to be extrapolated to other similar color proofing systems. Alternatively, similar types of experiments can be performed in order to obtain the desired measurements of additivity failure for a particular digital photosensitive color proofing system in order to optimize the model relationships of the color values of secondary colors as a function of the relative amounts of primary colorant ink thicknesses.

Figure 7A:
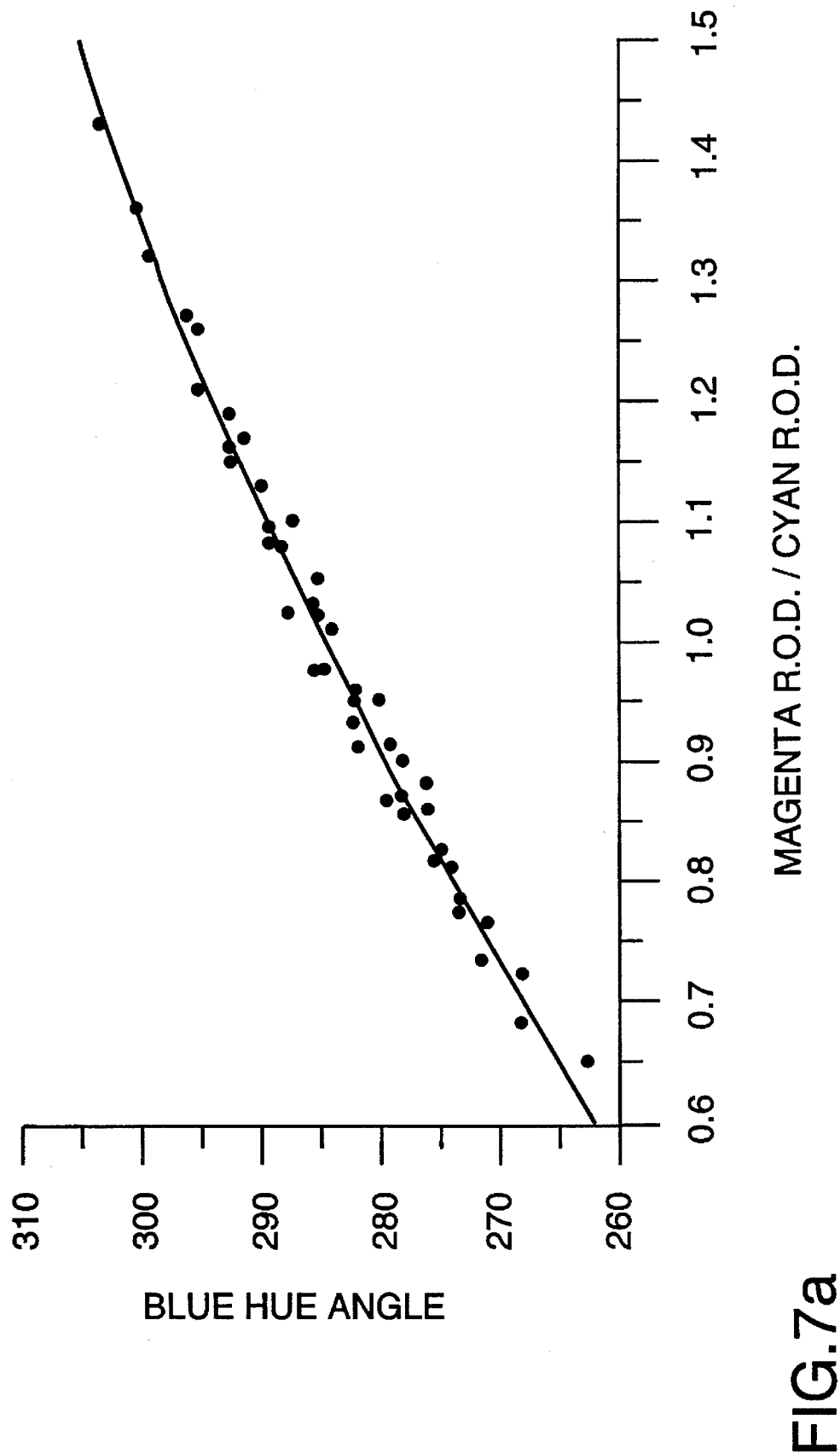
FIGS. 7a and 7b are graphs which show hue angle and chroma values as a function of ink thickness ratio for cyan over magenta and cyan over yellow.
Figure 7B:
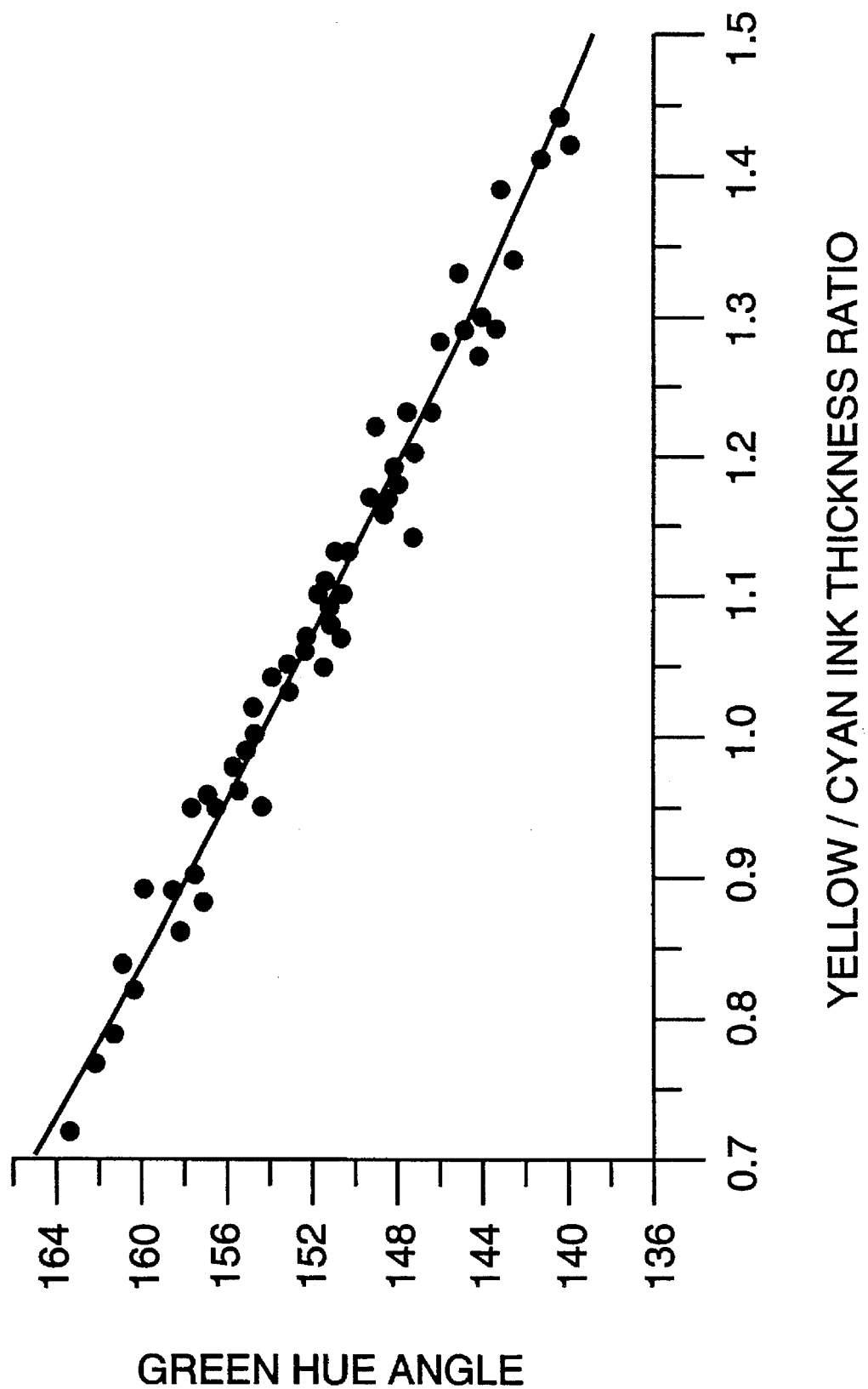

Referring now to FIGS. 7a–7b, the measurements of the additivity failure model of the preferred embodiment will now be described. For this model, Match Print™ color proofing inks available from 3M Company, St. Paul, Minn., were used to generate a series of images where the cause of trap and its effect on the color gamut characteristics of the color proofing system could be measured. A double transfer method was first used to quantify the effect of ratio of solid ink thickness on color hue and saturation. As described below, a voltage ramp was used to vary ink thickness from 1.1 to 1.8 R.O.D. for each colorant as transferred to the OPC film 16. A second ramp of the subsequent colorant was made and transferred to the same film at right angles to obtain a grid of ink thickness for each secondary color. This grid was laminated to paper and color measurements were taken using a SPM100 spectrophotometer.

FIGS. 7a–7b show hue angles measured from these tests as a function of ink thickness ratio for green and blue. As shown in FIG. 7a, blue hue angle shows good correlation with ink thickness ratio when magenta is deposited over cyan through a range of about 0.65 to 1.2 ($M_{ROD}/C_{ROD}$). Blue saturation or chroma is found to correlate closely with the sum of cyan and magenta ink thicknesses. FIG. 7b shows good correlation of green hue angle with ink thickness ratio of cyan deposited over yellow through a range of 0.7 to 1.5 ($Y_{ROD}/C_{ROD}$). Green chroma values are also found to correlate with the sum of the ink thicknesses increases through the range of 2.3 to 3.4. Similar relationships were also measured for red color values to magenta and yellow ink thicknesses.

Correlations of secondary color with primary ink thicknesses allow the use of the varied first parameter test described below to predict the actual color gamut 60 as a function of the primary colorant thicknesses and thereby perform the characterization of the digital photosensitive color proofing system in accordance with the present invention. Regression analysis of hue and saturation as a function of primary colorant allows the prediction of output secondary colors of the system. From this data, optimum ink thickness, e.g., as shown in Table I for publication offset printing (constrained to be within a given range, e.g., as shown in Table II) of each primary colorant for a given color order laydown sequence may be specified in order to produce the required two-dimensional transfer function for the color gamut 62 of the target printing system. Thus, even though the secondary color test patch 124, 126 and 128 may not have been printed at the desired ink thickness because the desired $D_{max}$ for one or more primary colorants fell between the ink thicknesses used to produce the two closest test segments 102b and 102c, for example, the proper secondary color model can still be produced for the desired $D_{max}$ for each of the primary colorants.

TABLE I

| D50 | 2 Degree | L* | a* | b* | C* | hab | Den | Dot Gain |
|---|---|---|---|---|---|---|---|---|
| Paper | White | 89.85 | 0.69 | 5.38 | 5.42 | 82.72 | 0.1 | 0 |
| Cyan | 100% | 58.19 | −38.91 | −36.82 | 53.57 | 223.41 | 1.22 | Averaged |
|  | 75% | 63.75 | −30.91 | −29.52 | 42.75 | 223.68 | 0 | 14 |
|  | 50% | 71.11 | −21.3 | −19.73 | 29.04 | 222.82 | 0 | 22 |
|  | 25% | 80.15 | −10.46 | −7.7 | 12.99 | 216.3 | 0 | 16 |
| Magenta | 100% | 46.31 | 73.22 | 1.16 | 73.26 | 0.89 | 1.52 | Averaged |
|  | 75% | 54.39 | 56.98 | −0.63 | 57 | 359.38 | 0 | 14 |
|  | 50% | 63.84 | 40.14 | −0.91 | 40.16 | 358.76 | 0 | 22 |
|  | 25% | 76.82 | 19.40 | 1.37 | 19.47 | 4.31 | 0 | 16 |
| Yellow | 100% | 84.56 | −3.69 | 89.3 | 89.37 | 92.37 | 1.44 | Averaged |
|  | 75% | 85.36 | −3.51 | 68.98 | 69.08 | 92.91 | 0 | 14 |
|  | 50% | 86.56 | −2.9 | 48.45 | 48.54 | 93.43 | 0 | 22 |
|  | 25% | 88.16 | −1.5 | 26.23 | 26.28 | 93.28 | 0 | 16 |
| Black | 100% | 21.53 | 1.05 | 1.85 | 2.15 | 56.18 | 1.5 | Averaged |
|  | 75% | 40.82 | 0.19 | 1.04 | 1.08 | 90.74 | 0 | 14 |
|  | 50% | 56.75 | 0.03 | 1.66 | 1.66 | 89.53 | 0 | 22 |
|  | 25% | 74.29 | 0.17 | 3.21 | 3.22 | 87.06 | 0 | 16 |
| Red | 100% | 46.06 | 67.86 | 45.99 | 82.01 | 34.09 | 0 | 0 |
|  | 75% | 53.74 | 40.98 | 67.6 | 37.33 | 37.33 | 0 | 0 |
|  | 50% | 62.19 | 37.16 | 31.87 | 48.97 | 40.66 | 0 | 0 |
|  | 25% | 75.4 | 17.69 | 19.46 | 26.35 | 47.86 | 0 | 0 |
| Green | 100% | 53.22 | −59.55 | 35.42 | 69.38 | 149.33 | 0 | 0 |
|  | 75% | 59.39 | −44.62 | 29.15 | 53.34 | 146.86 | 0 | 0 |
|  | 50% | 67.56 | −29.54 | 21.19 | 36.38 | 144.35 | 0 | 0 |
|  | 25% | 78.32 | −13.82 | 12.98 | 18.98 | 136.81 | 0 | 0 |
| Blue | 100% | 25.58 | 22.21 | −37.56 | 43.65 | 300.58 | 0 | 0 |
|  | 75% | 35.94 | 18.61 | −30.74 | 35.95 | 301.18 | 0 | 0 |
|  | 50% | 49.14 | 14.74 | −22.37 | 26.8 | 303.34 | 0 | 0 |

TABLE I-continued

| D50 | 2 Degree | L* | a* | b* | C* | hab | Den | Dot Gain |
|---|---|---|---|---|---|---|---|---|
| | 25% | 68.08 | 7.72 | −10.32 | 12.9 | 306.54 | 0 | 0 |

TABLE II

| D50 | CIELAB | ΔL* | ΔC* | Δhab | ΔDen | ΔDot Gain |
|---|---|---|---|---|---|---|
| Cyan | 100% | +/−1.0 | +/−2.0 | +/−1.5 | +/−0.8 | 0 |
| | 75% | +/−1.0 | +/−3.0 | +/−1.0 | 0 | +/−3.0 |
| | 50% | +/−1.0 | +/−3.0 | +/−1.5 | 0 | +/−4.0 |
| | 25% | +/−0.7 | +/−2.0 | +/−3.0 | 0 | +/−3.0 |
| Magneta | 100% | +/−1.5 | +/−1.5 | +/−2.5 | +/−0.8 | 0 |
| | 75% | +/−1.8 | +/−2.7 | +/−2.0 | 0 | +/−3.0 |
| | 50% | +/−1.5 | +/−3.0 | +/−2.5 | 0 | +/−4.0 |
| | 25% | +/−1.5 | +/−3.0 | +/−3.0 | 0 | +/−3.0 |
| Yellow | 100% | +/−1.0 | +/−3.0 | +/−1.0 | +/−0.8 | 0 |
| | 75% | +/−0.8 | +/−2.5 | +/−1.0 | 0 | +/−3.0 |
| | 50% | +/−0.6 | +/−2.0 | +/−1.0 | 0 | +/−4.0 |
| | 25% | +/−0.5 | +/−2.5 | +/−1.2 | 0 | +/−3.0 |
| Black | 100% | +/−2.5 | +/−1.5 | +/−20.0 | +/−0.8 | 0 |
| | 75% | +/−3.5 | +/−1.5 | +/−20.0 | 0 | +/−3.0 |
| | 50% | +/−3.5 | +/−1.0 | +/−7.0 | 0 | +/−4.0 |
| | 25% | +/−2.0 | +/−1.0 | +/−3.0 | 0 | +/−3.0 |
| Red | 100% | +/−2.0 | +/−2.0 | +/−2.5 | 0 | 0 |
| | 75% | +/−1.7 | +/−2.5 | +/−2.0 | 0 | 0 |
| | 50% | +/−1.5 | +/−2.5 | +/−2.5 | 0 | 0 |
| | 25% | +/−1.5 | +/−2.5 | +/−5.0 | 0 | 0 |
| Green | 100% | +/−2.0 | +/−2.5 | +/−4.0 | 0 | 0 |
| | 75% | +/−1.5 | +/−3.5 | +/−3.0 | 0 | 0 |
| | 50% | +/−1.2 | +/−2.3 | +/−3.0 | 0 | 0 |
| | 25% | +/−1.2 | +/−1.5 | +/−4.0 | 0 | 0 |
| Blue | 100% | +/−2.0 | +/−3.0 | +/−3.0 | 0 | 0 |
| | 75% | +/−2.0 | +/−3.0 | +/−3.0 | 0 | 0 |
| | 50% | +/−2.0 | +/−3.0 | +/−2.7 | 0 | 0 |
| | 25% | +/−2.5 | +/−3.0 | +/−4.5 | 0 | 0 |

Once the $D_{max}$ model and the secondary color model are obtained, the characterization of the solid ink thickness color gamut 60 has been completed. At this point an optional step of determining the solid area color gamut transfer function necessary to match or map the color gamut 60 to the color gamut 62 may be performed.

With respect to the mapping of the color gamut 60 to the color gamut 62, consider, for example, that there are six points on the color gamut which need to be optimized (excluding the 3 color neutral). A target density is selected for cyan, magenta and yellow colorants. Also, a target hue angle is selected for red, green and blue. A least squares fit of the normalized values of the measured data versus the target data can then be performed to minimize the error of difference between each target and the best optimized values. A simultaneous solution of a system of equations could also be used to optimize the error among all colorants. A weighting factor may be used for each value as well, if one characteristic is more important than another. For example, if it is necessary to match the green as close as possible, but the color proof is able to tolerate more variation in yellow density.

It will be recognized that other colorant models may also be used, such as saturation (S*) or chroma (C*) or lightness (L*) values or ΔE* to optimize the color gamut. The color gamut 60 also may be adjusted by the operator for aesthetic or selective reasons. For example, if the color proof is an advertising photograph of jewelry, it may be desirable to emphasize the gold tones in the photograph. Another example would be to adjust the three-color neutral tone to a particular operator preference.

Figure 8:
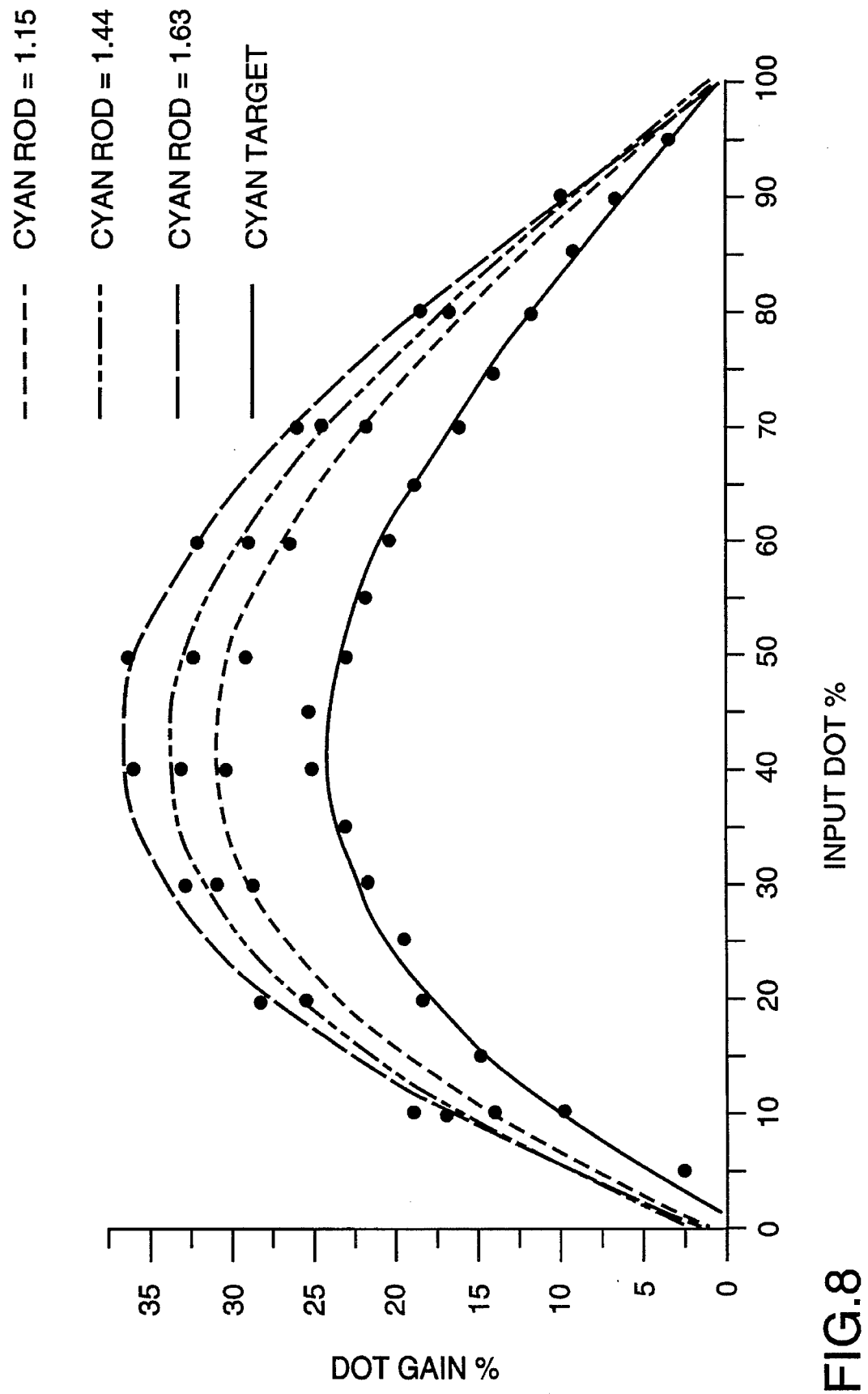
FIG. 8 is a graph of a sample model of a set of tone rendition curves.

Referring again to FIG. 6, at step 258, the model for the tone rendition is generated for each colorant for each segment 102 as a function of the solid ink area thickness from the tint patches 122a–122f. A sample model of a set of tone rendition curves is shown in FIG. 8. The number and manner in which the tint patches 122 are measured can vary significantly. The only requirement is that the measurements must be sufficient to obtain an accurate correlation for the full tone rendition curve. A spline fit may be used to determine the tone rendition curve within each segment 102. Alternatively, a curve fit relationship may be used that is found to give the required predictability. For example, in the SCE process it is observed that the interaction of the laser beam with the OPC 16 produces an image spot size dependent on the development voltage used. Hence, the halftone dot output reproduction from this proofing system may be mathematically derived as a function of the input value and this relationship can then be used to correlate the measured tone rendition data within each segment 102.

Finally, at step 260, the dot lookup table is generated as a function of the $D_{max}$ selected for each colorant. This is done by an extrapolation technique for each input dot value based on the relevant tone rendition models for the segments 102a–102e. Although the accuracy of the extrapolation technique can be increased by using tone rendition models for more than two of the segments 102a–102e, it has been found that accurate dot lookup tables can be generated using a linear colormetric fit of the tone rendition models of the segments 102 with $D_{max}$ values just higher and just lower than the required ink thickness for the particular colorant. This method allows the tone curve for each ink colorant to be independently calculated to obtain the required overall dot gain for the target conditions that are to be matched. Likewise, this method allows a change to be made in the solid area color gamut with an associated shift in tonal curve without physically recalibrating the color proofing system 10.

Once the dot lookup tables have been generated for the full color gamut, the dot lookup tables are used by the computer 36 to produce an off-press proof that will match the target color gamut of the particular printing process being proofed. By using the present invention, the full color gamut characterization process for color proofing systems can be reduced to the printing and subsequent calibration of a single test pattern page 100.

In the preferred embodiment, the $D_{max}$ or density calibration portion of the color gamut characterization, also known as the development voltage ramp test, is used by the proofing system 10 to generate system charge and development models. For a detailed description of the specifics of the charge and development models for the proofing system 10, reference is made to the previously referenced co-pending application entitled "Method for Calibrating an Electrophotographic Proofing System".

Charge models are information stored in computer 36 which characterize the relationship between a range of grid voltages $V_g$ applied to scorotron 20 and the resulting measured OPC voltage contrasts $V_c$, where $V_c=V_i-V_f$. The OPC voltage contrast is a parameter which describes the actual measured charge characteristics of OPC 16. For each grid voltage, the associated OPC voltage contrast is determined by computer 36 from the initial voltage $V_i$ and the final voltage $V_f$ measured by sensor 40 after portions of the OPC have been imaged by laser and scanner 22. A separate charge model is generated and stored for each component colorant.

Development models are information stored in computer 36 which characterize the relationship between a range of development voltages applied to toning stations 20 and the resulting measured optical density, D, of toner transferred to OPC 16. As described above, the development voltage contrast, or development voltage $V_d$ is defined such that $V_d=V_b-V_f$. The optical density, D, is a parameter which describes the actual measured color characteristics of the toned image. A separate development model is generated and stored for each component color.

Computer 36 uses the characterization information described above to generate the charge and development models for each component color. In one embodiment, the models are stored as parameters of quadratic Equations 2 and 3, below, fit to the sets of data using an ordinary least squares approach. In other embodiments, the development system model can be fit as a linear relationship. Alternatively, the models can be stored as lookup tables.

Charge System Model $V_c=AV_g^2+BV_g+C$     Eq. 2

Development System Model $D=EV_d^2+FV_d+G$     Eq. 3

The preferred manner of measuring the tint patches 122 to develop a tone rendition curve, and from the tone rendition curve a lookup table for the associated $D_{max}$ value for that segment 102, is to use a tone calibration software package such as PhotoShop™ software program, available from Adobe Systems, Inc. (PhotoShop is a trademark of Adobe Systems, Inc.), or Precision™ software program available from Southwest Software, Inc (Precision is a trademark of Southwest Software, Inc.). For a detailed description of the specifics of such a tone calibration software package, reference is made to the previously referenced co-pending application entitled "Color Correction with a Four-Dimensional Look-up Table".

The tone rendition curve and associated lookup tables are a set of points representative of the range of color shades and intensities available in the YMCK color spectrum. This range is also know as the "four-dimensional color space." For a typical proofing system having 8 bits of color resolutions, each of the four YMCK colors may be divided into 256 individual shades, yielding $(256)^4$, or almost 500 million possible color tone combinations. Obviously, it is not practical to print and test tint patches for each color tone combination.

In the preferred embodiment, six levels of tints for each of the primary and secondary colors are used to define the tone rendition curve. These six levels are represented as the test tints 122a–122f as shown in FIG. 4. The resulting 4×6 matrix provides a minimum number of measurements from which to determine a fairly accurate tone rendition curve. In the situation where the target printing system is a printing press and the color proofing system 10 is an SCE color proofing system, the inks used are relatively similar in color reproduction characteristics and, hence, a minimal matrix, such as the 4×6 matrix, can provide an accurate estimation of the tone rendition curve, as shown, for example, in FIG. 8. A more complete tone rendition curve might also be obtained by increasing the number of test tints 122 from six to twenty, for example.

An alternative approach to measuring the four dimensional color space is to use the test pattern matrix as defined in the previously referenced co-pending application for the test tints 122 in order to obtain a more accurate tone rendition curve. A more accurate tone rendition curve would be desirable, for example, when the target printing system is an ink jet printing system or thermal die sublimation system where the color of the primary colorants is significantly different than the ink colors of an SCE color proofing system, or where the target printing system is more of a continuous tone printing system, rather than a halftone printing system. In this embodiment, a selected test pattern matrix has either 5 or 6 levels per YMCK colorant for each overprint combination, yielding $(5)^4$, 625, or $(6)^4$, 1,296 test tints to be printed and measured, that is subsequently expanded into a 17×17×17×17 matrix representative of the possible shades at 16 different levels. This is done by first subdividing the color space of the color proofing system 10 into 17 equally spaced levels of color density for each of the YMCK colorants representing a coarse color space, and then generating a 6×6×6×6 matrix that is formed by selecting 6 levels from the 17 levels of coarse color space for each colorant.

Measurements of the test tints for the 6×6×6×6 matrix are obtained and fed into a computer which expands the non-uniform 6×6×6×6 matrix into a uniform 17×17×17×17 matrix of coarse color space. This can be done by applying a four-dimensional version of a cubic spline interpolation to the 6×6×6×6 matrix. This interpolation converts the non-uniform 6×6×6×6 matrix sample spacing into a uniform 17×17×17×17 matrix and preserves most of the nonlinearities present in the proofing system 10. The result is a four-dimensional YMCK database of $(17)^4$, 83,521 L*a*b values that are generated for each segment 102. Again, as indicated above, the dot lookup table is then extrapolated from the databases for each of the segments 102 for each colorant depending upon the required ink thickness.

What is claimed is:

1. A method of characterizing a full color gamut of a digital photosensitive color proofing system having at least two separately controllable process parameters that control color density and tone reproduction of three or more colorants used to produce a color print image from a digital image, the method comprising the steps of:

(a) adjusting a first process parameter to produce a plurality of color density test areas, each color density test area having a test patch for each colorant printed at a selected color density that is within a range of color densities capable of being printed by the digital photosensitive color proofing system;

(b) adjusting a second process parameter to produce a plurality of tone rendition test areas, one for each of the color density test areas, each tone rendition test area having a plurality of test tints for each colorant as a primary color and a plurality of test patches for a set of secondary colors composed from combinations of the primary colors;

(c) printing a single test pattern page, the test pattern page including both the plurality of color density test areas and the plurality of tone rendition test areas;

(d) measuring selected ones of the test patches and test tints to characterize the full color gamut in terms of a primary and secondary color gamut and tone renditions for the range of color densities creating measurements; and (e) optimizing the full color gamut using a predetermined model of the relationship of primary colorant to secondary colors.

2. The method of claim 1 further comprising the steps of:

(e) determining a desired set of target conditions for the color density and tone rendition of the color print image; and (f) using the primary and secondary color gamut and tone renditions for the range of color densities to establish a required first process parameter and a required second process parameter that will provide for accurate color reproduction of the predetermined set of target conditions for the color density and tone rendition of the color print image.

3. The method of claim 2 wherein step (g) is accomplished by extrapolation of the measurements taken in step (d) to predict the required first process parameter and the required second process parameter.

4. The method of claim 1 wherein the digital photosensitive color proofing system is an electrophotographic color proofing system and wherein the first process parameter selectively determines color density by altering a grid voltage of the electrophotographic color proofing system.

5. The method of claim 1 wherein the digital photosensitive color proofing system is an electrophotographic color proofing system and wherein the first process parameter selectively determines color density by altering a laser intensity of the electrophotographic color proofing system.

6. The method of claim 1 wherein each of the test tints has a tone reproduction percentage and wherein the second process parameter selectively determines tone rendition by varying the tone reproduction percentage of the test tints in each tone rendition test area to allow for the modeling of a tonal rendition curve for each colorant for each tone density test area.

7. The method of claim 1 wherein each color density test area has an amount of ink thickness for each primary colorant and wherein the predetermined model of primary colorant to secondary colors correlates a color measurement for each secondary color as a function of the amount of ink thickness of each primary colorant.

8. The method of claim 7 wherein the predetermined model of primary colorant to secondary colors compensates for the additivity failure of the color proofing system.

9. The method of claim 1 wherein the test pattern page comprises:

a generally planar support member;

a plurality of color density test areas disposed on the support member, each color density test area having a test patch for each colorant printed at a selected color density that is within a range of color densities capable of being printed by the digital photosensitive color proofing system; and a plurality of tone rendition test areas disposed on the support member, one for each of the color density test areas, each tone rendition test area having a plurality of test tints for each colorant as a primary color and a plurality of test patches for a set of secondary colors composed from combinations of each colorant as a primary colorant.

10. The method of claim 9 wherein the color density test areas comprise:

at least a maximum density test area and a minimum density test area, each having test patches being printed at a preselected respective density, including test patches for the following colorants:

a cyan color sample test patch, a magenta color sample test patch, a yellow color sample test patch, a red color sample test patch, a green color sample test patch, a blue color sample test patch, and a black color sample test patch.

11. The method of claim 10 wherein each color rendition test area comprises five or more test tints for each colorant, each test tint printed at a unique tone reproduction percentage selected such that a tonal rendition curve may be modeled for each colorant for each tone density test area.

12. A one page color standard for characterizing a full color gamut of an off-press digital photosensitive color proofing system, comprising:

a generally planar support member;

a plurality of color density test areas disposed on the support member, each color density test area having a test patch for each colorant printed at a selected color density that is within a range of color densities capable of being printed by the digital photosensitive color proofing system; and a plurality of tone rendition test areas disposed on the support member, one for each of the color density test areas, each tone rendition test area having a plurality of test tints for each colorant as a primary color and a plurality of test patches for a set of secondary colors composed from combinations of the primary colors, such that selected measurements of the test patches and test tints from a single support member characterize the full color gamut in terms of a secondary color gamut and tone renditions for the range of color densities for the digital photosensitive color proofing system.

13. The color standard of claim 12 wherein the color density test areas comprise at least a maximum density test area and a minimum density test area, each having test patches being printed at a preselected respective density, including test patches for the following colorants:

a cyan color sample test patch, a magenta color sample test patch, a yellow color sample test patch, a red color sample test patch, a green color sample test patch, a blue color sample test patch, and a black color sample test patch.

14. The color standard of claim 12 wherein each color rendition test area comprises five or more test tints for each colorant, each test tint printed at a unique tone reproduction percentage selected such that a tonal rendition curve may be modeled for each colorant for each tone density test area.

15. The method of claim 1 wherein said color density test areas are produced at $D_{max}$.

16. The color standard of claim 12 wherein said color density test areas are produced in a range of color densities $D_{max}$.

17. A method of characterizing a full color gamut of a digital photosensitive color proofing system having at least one controllable process parameter that control color density of three or more primary colorants used to produce a color print image from a digital image, the method comprising the steps of:

(a) adjusting said process parameter to produce a plurality of color density test areas, each color density test area having a test patch for each colorant printed at a selected color density that is within a range of color densities capable of being printed by the digital photosensitive color proofing system and a plurality of test patches for a set of secondary colors composed from combinations of the primary colorants;

(b) printing a single test pattern page, the test pattern page including the plurality of color density test areas;

(c) measuring selected ones of the test patches to characterize the full color gamut in terms of a primary and secondary color gamut and tone renditions for the range of color densities creating measurements; and (d) optimizing the full color gamut using a predetermined model of a relationship of primary colorant to secondary colors.

18. The method of claim 17 further comprising the steps of:

(e) determining a desired set of target conditions for the color density of the color print image; and (f) using the primary and secondary color gamut for the range of color densities to establish a required first process parameter that will provide for accurate color reproduction of the predetermined set of target conditions for the color density of the color print image.

19. The method of claim 18 wherein step (f) is accomplished by extrapolation of the measurements taken in step (c) to predict the required first process parameter.

20. The method of claim 17 wherein the digital photosensitive color proofing system is an electrophotographic color proofing system and wherein the first process parameter selectively determines color density by altering a grid voltage of the electrophotographic color proofing system.

21. The method of claim 17 wherein the digital photosensitive color proofing system is an electrophotographic color proofing system and wherein the first process parameter selectively determines color density by altering a laser intensity of the electrophotographic color proofing system.

22. The method of claim 17 wherein the predetermined model of primary colorant to secondary colors correlates a color measurement for each secondary color as a function of an amount of ink thickness of each primary colorant.

23. The method of claim 22 wherein the predetermined model of primary colorant to secondary colors compensates for the additivity failure of the color proofing system.

24. The method of claim 17 wherein said color density test areas are produced in a range of color densities $D_{max}$.

25. The method of claim 17 wherein the test pattern page comprises the steps of using:

a generally planar support member; and a plurality of color density test areas disposed on the support member, each color density test area having a test patch for each primary colorant and each secondary color printed at a selected color density that is within a range of color densities capable of being printed by the digital photosensitive color proofing system.

26. The method of claim 25 wherein the color density test areas comprise at least a maximum density test area and a minimum density test area, each having test patches printed at the preselected respective density, including test patches for the following colorants:

a cyan color sample test patch, a magenta color sample test patch, a yellow color sample test patch, a red color sample test patch, a green color sample test patch, a blue color sample test patch, and a black color sample test patch.

27. A one page color standard for characterizing a full color gamut of an off-press digital photosensitive color proofing system, comprising:

a generally planar support member; and a plurality of color density test areas disposed on the support member, each color density test area having a test patch for each primary colorant printed at a selected color density that is within a range of color densities capable of being printed by the digital photosensitive color proofing system and a plurality of, test patches for a set of secondary colors composed from combinations of the primary colorants, such that selected measurements of the test patches from a single support member characterize the full color gamut in terms of a secondary color gamut for the range of color densities for the digital photosensitive color proofing system.

28. The color standard of claim 27 wherein said color density test areas are produced at $D_{max}$.

29. The color standard of claim 27 wherein the color density test areas comprise at least a maximum density test area and a minimum density test area, each having test patches printed at the preselected respective density, including test patches for the following colorants:

a cyan color sample test patch, a magenta color sample test patch, a yellow color sample test patch, a red color sample test patch, a green color sample test patch, a blue color sample test patch, and a black color sample test patch.

* * * * *